US011209563B2

(12) United States Patent
Liu et al.

(10) Patent No.: US 11,209,563 B2
(45) Date of Patent: Dec. 28, 2021

(54) DATA OPTIMIZATION METHOD AND INTEGRAL PRESTACK DEPTH MIGRATION METHOD

(71) Applicant: Institute of Geology and Geophysics, Chinese Academy of Sciences, Beijing (CN)

(72) Inventors: Linong Liu, Beijing (CN); Hongwei Gao, Beijing (CN); Wei Liu, Beijing (CN); Jianfeng Zhang, Beijing (CN)

(73) Assignee: INSTITUTE OF GEOLOGY AND GEOPHYSICS, Beijing (CN)

( * ) Notice: Subject to any disclaimer, the term of this patent is extended or adjusted under 35 U.S.C. 154(b) by 209 days.

(21) Appl. No.: 16/556,430

(22) Filed: Aug. 30, 2019

(65) Prior Publication Data
US 2020/0363549 A1  Nov. 19, 2020

(30) Foreign Application Priority Data
May 14, 2019 (CN) .......................... 201910397720.9

(51) Int. Cl.
G01V 1/36 (2006.01)
G06F 17/16 (2006.01)
G06F 17/18 (2006.01)
G06T 1/20 (2006.01)

(52) U.S. Cl.
CPC .............. *G01V 1/362* (2013.01); *G06F 17/16* (2013.01); *G06F 17/18* (2013.01); *G06T 1/20* (2013.01); *G01V 2210/512* (2013.01)

(58) Field of Classification Search
CPC .. G01V 1/362; G01V 2210/512; G06F 17/16; G06F 17/18; G06T 1/20
See application file for complete search history.

(56) References Cited

U.S. PATENT DOCUMENTS

2016/0013773 A1* 1/2016 Dourbal ................. G06F 17/16
708/209
2019/0331813 A1* 10/2019 Zhang ................. G06K 9/6247

\* cited by examiner

*Primary Examiner* — Elias Desta
(74) *Attorney, Agent, or Firm* — Hogan Lovells US LLP

(57) ABSTRACT

A data optimization method and an integral prestack depth migration method are provided, including acquiring a target matrix to be optimized; generating a first sequence according to the target matrix; rarefying the first sequence according to a preset grid density to obtain a value position of each element of a second sequence, and working out a value of each element of the second sequence on the basis of the principle of least squares; performing interpolation on the second sequence to obtain a third sequence; calculating a target matrix corresponding to the third sequence; calculating an error between the target matrix to be optimized and the target matrix corresponding to the third sequence; recording, when the error is less than the first error threshold, the target matrix corresponding to the above second sequence as an optimized target matrix of the target matrix to be optimized.

9 Claims, 11 Drawing Sheets

DATA OPTIMIZATION METHOD AND INTEGRAL PRESTACK DEPTH MIGRATION METHOD

CROSS-REFERENCE TO RELATED APPLICATION

The present disclosure claims the priority to the patent application with the filing number 2019103977209 filed on May 14, 2019 with the Chinese Patent Office and entitled "Data Optimization Method and Integral Prestack Depth Migration Method", the contents of which are incorporated herein by reference in entirety.

TECHNICAL FIELD

The present disclosure relates to the technical field of seismic exploration, in particular to a data optimization method and an integral prestack depth migration method.

BACKGROUND ART

In practice of existing seismic prestack migration methods, the integral prestack migration technology, represented by Kirchhoff method, predominates. The Kirchhoff method of seismic prestack migration is mainly divided into two categories, Kirchhoff prestack time migration and Kirchhoff prestack depth migration.

In order to realize the earth's absorption compensation to seismic waves, we need to introduce an effective Q related to a seismic wave propagation path in a Kirchhoff prestack depth migration realization process, which effective Q is related to Q values of all layers on a propagation path of the seismic waves from a shot point to an imaging point, and then to a receiver point. Therefore, in the technology of compensation medium absorption (deabsorption) Kirchhoff prestack depth migration, in order to obtain a correct migration amplitude, apart from calculating and storing a traveltime table in advance, an effective Q table further needs to be additionally stored. However, for seismic data having high spatial and time sampling density with high folds of coverage, a traveltime table and an effective Q table thereof need a large memory capacity, and which is positively correlated to the folds of coverage. In sharp contrast, a GPU card is mainly featured by good calculation, but a memory capacity thereof is quite limited.

At present, the strategy of using a CPU to read the traveltime table and the effective Q table imaging point by imaging point, and then using communication between the CPU and the GPU, so as to meet the requirement of the traveltime table and the effective Q when the GPU is utilized to calculate an imaging point migration amplitude, will greatly reduce the calculation efficiency of GPU parallel calculation, such that the calculation efficiency of calculating the compensation medium absorption Kirchhoff prestack depth migration with GPU is low.

SUMMARY

In view of this, an object of the present disclosure includes, for example, providing a data optimization method and an integral prestack depth migration method, which can approximate the initially larger "traveltime table and effective Q table" with the smaller "traveltime table and effective Q table", and in a condition that calculation precision is met, the storage requirement to a GPU is greatly reduced, such that the efficiency of the parallel calculation of the technology of compensation medium absorption Kirchhoff integral prestack depth migration with GPU is improved to a great extent. The technology of compensation medium absorption Kirchhoff integral prestack depth migration, on one hand, can realize high-precision imaging of deep and super deep exploration targets with complicated structure, and obtain more accurate structural information about subsurface deep and super deep exploration targets, such as a formation dip, strike, and the like, and on the other hand, can sufficiently tap the broadband advantage of the seismic data with high spatial and time sampling density, to improve the resolution of a seismic migration imaging data volume by about 20 Hz, facilitating acquiring lithology and refined small-scale structural information of the deep and super deep subsurface exploration targets, such as thin reservoir lateral distribution, minor fault breakpoint location, thus being a great help for exploration of deep and super deep complex structure and lithologic reservoirs.

An embodiment of the present disclosure provides a data optimization method, including: acquiring a target matrix to be optimized, wherein the target matrix is a traveltime table or an effective Q table; generating a first sequence according to the target matrix; rarefying the first sequence according to a preset grid density to obtain a value position of each element of a second sequence, and working out a value of each element of the second sequence on the basis of the principle of least squares, wherein the number of elements of the second sequence is far less than the number of elements of the first sequence; performing interpolation on the second sequence to obtain a third sequence, wherein the third sequence and the first sequence have the same number of elements; calculating a target matrix corresponding to the third sequence; calculating an error between the target matrix to be optimized and the target matrix corresponding to the third sequence; comparing magnitudes of the error and a preset first error threshold, when the error is greater than the preset first error threshold, a grid density is increased according to a preset rule, and it is continued to perform the step of rarefying the first sequence according to the preset grid density to obtain the value position of each element of the second sequence; recording, when the error is less than the first error threshold, the target matrix corresponding to the above second sequence as an optimized target matrix of the target matrix to be optimized.

In an embodiment of the present disclosure, optionally, the above step of generating a first sequence according to the target matrix includes: converting firstly, when the target matrix is a traveltime table, the traveltime table to a slowness table, and then generating the first sequence according to all elements of the slowness table; generating, when the target matrix is an effective Q table, the first sequence according to all elements of the effective Q table.

In an embodiment of the present disclosure, optionally, the above step of working out a value of each element of the second sequence on the basis of the principle of least squares includes: applying, with all elements of the second sequence as a discrete point set, an interpolation algorithm to approximate the value of each element of the first sequence, so as to determine a target function thereby.

In an embodiment of the present disclosure, optionally, the above step of working out the value of each element of the second sequence on the basis of the principle of least squares includes: calculating a partial derivative of each element in the second sequence, and letting the partial derivative of each element be 0, to obtain an equation set about each element; and solving the equation set to obtain the value of each element.

In an embodiment of the present disclosure, optionally, the above step of calculating an error between the target matrix to be optimized and the target matrix corresponding to the third sequence includes: calculating an absolute value of a difference of corresponding elements in the target matrix corresponding to the third sequence and in the target matrix to be optimized; calculating, by statistics, a percentage of the number of elements, having the absolute value of the difference greater than a preset deviation threshold, accounts for in the total number of elements of the target matrix to be optimized; and taking the percentage as the error between the target matrix corresponding to the third sequence and the target matrix to be optimized.

In an embodiment of the present disclosure, optionally, after the above step of recording, when the error is less than the first error threshold, the target matrix corresponding to the second sequence as an optimized target matrix of the target matrix to be optimized, the method further includes: recording the grid density, and taking the number of samples and an interval corresponding to the grid density, as shared optimization parameters of the target matrix.

Optionally, an embodiment of the present disclosure further provides an integral prestack depth migration method, applied to a CPU, wherein the method includes: acquiring prestack seismic data and migration parameters of a target working area, and an imaging line traveltime table and an imaging line effective Q table of an imaging space of the target working area; optimizing the imaging line traveltime table and the imaging line effective Q table using the data optimization method provided in an embodiment of the present disclosure to obtain an imaging line optimized traveltime table and an imaging line optimized effective Q table; storing the imaging line optimized traveltime table and the imaging line optimized effective Q table with the imaging line as an unit; and sending to the GPU the prestack seismic data, the migration parameters, and the imaging line optimized traveltime table and the imaging line optimized effective Q table, with the imaging line as an unit, so as to calculate migration amplitudes of each imaging point corresponding to different offsets within the imaging space of the target working area according to the imaging line optimized traveltime table, the imaging line optimized effective Q table, the prestack seismic data and the migration parameters.

In an embodiment of the present disclosure, optionally, the above step of storing the imaging line optimized traveltime table and the imaging line optimized effective Q table with the imaging line as an unit includes: constructing a first index file of the imaging line optimized traveltime table and a second index file of the imaging line optimized effective Q table with the imaging line as an unit, wherein the first index file includes an imaging block dividing parameter of the imaging line, a shared traveltime table optimization parameter within each imaging block, and a storage position of an optimized traveltime table of a first imaging point within each imaging block in a data file of the imaging line optimized traveltime table; the second index file includes an imaging block dividing parameter, a shared effective Q table optimization parameter within each imaging block, and a storage position of an optimized effective Q of a first imaging point within each imaging block in a data file of the imaging line optimized effective Q table; storing the first index file and the second index file, and storing the data file of the imaging line optimized traveltime table and the data file of the imaging line optimized effective Q table in an unsigned short integer variable type.

In an embodiment of the present disclosure, optionally, the above step of storing the data file of the imaging line optimized traveltime table and the data file of the imaging line optimized effective Q table in an unsigned short integer variable type includes: storing the data file of the imaging line optimized traveltime table and the data file of the imaging line optimized effective Q table respectively as for individual imaging blocks, according to a first relation and a second relation, wherein the first relation is:

$$\tau^{GPU}[imx_P^\tau, imy_P^\tau, ixi, izi] = (\text{unsigned short int})(\tau^{opti}[ixi, izi, imx_P^\tau, imy_P^\tau] \times k + b)$$

the second relation is:

$$Q^{GPU}[imx_P^Q, imy_P^Q, ixi, izi] = (\text{unsigned short int})(Q^{opti}[ixi, izi, imx_P^Q, imy_P^Q]),$$

in the formula: $ixi$ is an x-direction index of a position of an imaging point within an imaging block, $izi$ is a z-direction index of the position of the imaging point within the imaging block, $imx_P^\tau$ is an x-direction index of a shot point in an imaging point optimized traveltime table, $imy_P^\tau$ is a y-direction index of the shot point in the imaging point optimized traveltime table, $imx_P^Q$, is an x-direction index of a shot point in an imaging point optimized effective Q table, $imy_P^Q$ is a y-direction index of the shot point in the imaging point optimized effective Q table; k is $$\frac{\max\tau}{65535},$$

max τ is a maximal value of the traveltime in an imaging space optimized traveltime table of the target working area, b is 0.0; $\tau^{GPU}[imx_P^\tau, imy_P^\tau, ixi, izi]$ represents a storage order of data files of the imaging block optimized traveltime table; $\tau^{opti}[ixi, izi, imx_P^\tau, imy_P^\tau]$ represents a data format of the imaging block optimized traveltime table; $Q^{opti}[ixi, izi, imx_P^Q, imy_P^Q]$ represents a data format of the imaging block optimized effective Q table; $Q^{GPU}[imx_P^Q, imy_P^Q, ixi, izi]$ represents a storage order of data files of the imaging block optimized effective Q table.

In an embodiment of the present disclosure, optionally, the GPU only receives the imaging line optimized traveltime table and the imaging line optimized effective Q table of one imaging line at one time, and calculates the migration amplitudes of each imaging point corresponding to different offsets in the imaging line according to the imaging line optimized traveltime table and the imaging line optimized effective Q table, the prestack seismic data and the migration parameters, and after this imaging line is calculated, the imaging line optimized traveltime table and the imaging line optimized effective Q table corresponding to a next imaging line are received to perform a new round of calculation, which is repeated, until the migration amplitudes of each imaging point corresponding to different offsets within the imaging space of the target working area are calculated.

An embodiment of the present disclosure further provides an integral prestack depth migration method, applied to a GPU, wherein the method includes: receiving prestack seismic data and migration parameters of a target working area sent by a CPU, and an imaging line optimized traveltime table and an imaging line optimized effective Q table of an imaging space of the target working area sent by the CPU with the imaging line as an unit, wherein the imaging space is divided into a plurality of imaging lines, each of the imaging lines is divided into a plurality of imaging blocks, and each imaging block contains a plurality of imaging points; the imaging line optimized traveltime table and the imaging line optimized effective Q table are obtained by optimizing, by the above CPU using the data optimization method provided in an embodiment of the present disclosure, an imaging line traveltime table and an imaging line effective Q table of the target working area; and calculating migration amplitudes of each imaging point corresponding to different offsets within the imaging space of the target working area according to the imaging line optimized traveltime table, the imaging line optimized effective Q table, the prestack seismic data and the migration parameters.

In an embodiment of the present disclosure, optionally, the CPU and the GPU calculate in parallel cooperatively, at this time, the GPU can acquire the prestack seismic data and the migration parameters of the target working area from the CPU, and moreover, the GPU only receives the imaging line optimized traveltime table and the imaging line optimized effective Q table of one imaging line at one time, and calculates the migration amplitudes of each imaging point corresponding to different offsets in the imaging line according to the imaging line optimized traveltime table and the imaging line optimized effective Q table, the prestack seismic data and the migration parameters, and after this imaging line is calculated, the imaging line optimized traveltime table and the imaging line optimized effective Q table corresponding to a next imaging line are received to perform a new round of calculation.

In an embodiment of the present disclosure, optionally, the above step of calculating migration amplitudes of each imaging point corresponding to different offsets within the imaging space of the target working area according to the imaging line optimized traveltime table, the imaging line optimized effective Q table, the prestack seismic data and the migration parameters includes: acquiring shot point coordinates and receiver point coordinates of a prestack seismic trace; determining a size of a GPU block and a size of a GPU grid; calculating a thread index of each imaging point in the imaging line according to the size of the GPU block and the size of the GPU grid, wherein the thread index includes a depth position index and a transverse position index; thread-reading a first index file and a second index file of the imaging line according to the thread index, to determine a traveltime table optimization parameter and an effective Q table optimization parameter of an imaging block where each imaging point is located, and a storage position of an optimized traveltime table of a first imaging point within the imaging block where the imaging point is located in a data file of the imaging line optimized traveltime table, and a storage position of an optimized effective Q table of the first imaging point within the imaging block where the imaging point is located in a data file of the imaging line optimized effective Q table; thread-acquiring traveltime and an effective Q from a shot point corresponding to the prestack seismic trace to the imaging point, and traveltime and an effective Q from a receiver point corresponding to the prestack seismic trace to the imaging point, according to the shot point coordinates, the receiver point coordinates, as well as the first index file and the second index file corresponding to the imaging line, and a data file of the imaging line optimized traveltime table and a data file of the imaging line optimized effective Q table; thread-calculating a migration amplitude of each imaging point according to an imaging formula, wherein the imaging formula is:

$$I(h, x_p, y_p, z_p) = \frac{\tau_g r_s^3}{\tau_s r_g^3} \int F(\omega)\omega \exp\left(-j\frac{\pi}{2}\right)\exp\left[j\omega(\tau_s + \tau_g) - \left(\frac{\tau_s}{Q_s} + \frac{\tau_g}{Q_g}\right)\frac{\ln(\omega/\omega_0)}{\pi}\right]$$
$$\exp\left\{\frac{\omega}{2}\left(\frac{\tau_s}{Q_s} + \frac{\tau_g}{Q_g}\right)\right\}d\omega.$$

In the formula: $I(h, x_p, y_p, z_p)$ is a migration amplitude of the imaging point, h is a prestack seismic trace offset, j is an imaginary part unit, $\omega$ is a frequency, $\omega_0$ is a seismic data dominant frequency, $F(\omega)$ is a sequence for the prestack seismic trace converted to a frequency domain, $r_s, r_g$ are distances from the shot point and the receiver point corresponding to the prestack seismic trace to the imaging point respectively, $\tau_s$ and $Q_s$ are traveltime and an effective Q from the shot point corresponding to the prestack seismic trace to the imaging point respectively, and $\tau_g$ and $Q_g$ are traveltime and an effective Q from the receiver point corresponding to the prestack seismic trace to the imaging point respectively.

In an embodiment of the present disclosure, optionally, the above step of thread-acquiring traveltime from a shot point corresponding to the prestack seismic trace to the imaging point and traveltime from a receiver point corresponding to the prestack seismic trace to the imaging point includes: calculating, according to the shot point coordinates, the receiver point coordinates, and the traveltime table optimization parameter, a first grid of the optimized traveltime table corresponding to the shot point coordinates as well as first index values of four vertexes of the first grid, and a second grid of the optimized traveltime table corresponding to the receiver point coordinates as well as second index values of four vertexes of the second grid; calculating, according to the first index value and the second index value, first position and second position of traveltimes of the four vertexes of the first grid and the four vertexes of the second grid in the data files of the imaging line optimized traveltime table, respectively, and reading the traveltimes of the four vertexes of the first grid and the traveltimes of the four vertexes of the second grid according to the first position and the second position; calculating slowness values of the four vertexes of the first grid, and slowness values of the four vertexes of the second grid, respectively, according to the traveltimes of the four vertexes of the first grid and the traveltimes of the four vertexes of the second grid; interpolating according to the slowness values of the four vertexes of the first grid and the slowness values of the four vertexes of the second grid, respectively, to obtain a first slowness value and a second slowness value of the imaging point; and calculating the traveltime from the shot point corresponding to the prestack seismic trace to the imaging point, and the traveltime from the receiver point corresponding to the prestack seismic trace to the imaging point, respectively, according to the first slowness value and the second slowness value.

In an embodiment of the present disclosure, optionally, the above step of thread-acquiring an effective Q from a shot point corresponding to the prestack seismic trace to the imaging point and an effective Q from a receiver point corresponding to the prestack seismic trace to the imaging point includes: calculating, according to the shot point coordinates, the receiver point coordinates, and an effective Q table optimization parameter, a third grid of the optimized effective Q table corresponding to the shot point coordinates as well as third index values of four vertexes of the third grid, and a fourth grid of the optimized effective Q table corresponding to the receiver point coordinates as well as fourth index values of four vertexes of the fourth grid; calculating, according to the third index values and the fourth index values, third position and fourth position of the effective Q values of the four vertexes of the third grid and the four vertexes of the fourth grid in the data files of the imaging line optimized effective Q table, and reading the effective Q values of the four vertexes of the third grid, and the effective Q values of the four vertexes of the fourth grid according to the third position and the fourth position; and interpolating according to effective Q values of the four vertexes of the third grid, and the effective Q values of the four vertexes of the fourth grid respectively to obtain the effective Q from the shot point corresponding to the prestack seismic trace to the imaging point, and the effective Q from the receiver point corresponding to the prestack seismic trace to the imaging point.

Optionally, an embodiment of the present disclosure further provides an integral prestack depth migration method, including: acquiring, by a CPU, prestack seismic data and migration parameters of a target working area; calculating, by the CPU, an activation point traveltime table and an activation point effective Q table of the target working area according to the prestack seismic data and a migration parameters; calculating, by the CPU, an imaging space traveltime table and an imaging space effective Q table of the imaging space of the target working area according to the activation point traveltime table and the activation point effective Q table, wherein the imaging space traveltime table is divided into a plurality of imaging line traveltime tables, and the imaging space effective Q table is divided into a plurality of imaging line effective Q tables; optimizing, by the CPU, the imaging line traveltime table and the imaging line effective Q table using the data optimization method provided in the above embodiment, to obtain and store the imaging line optimized traveltime table and the imaging line optimized effective Q table; sending, by the CPU, the imaging line optimized traveltime table and the imaging line optimized effective Q table to the GPU with the imaging line as an unit, and sending the prestack seismic data and the migration parameters to the GPU; thread-reading, by the GPU, the imaging line optimized traveltime table and the imaging line optimized effective Q table, so as to calculate migration amplitudes of each imaging point corresponding to different offsets within the imaging space of the target working area according to the imaging line optimized traveltime table, the imaging line optimized effective Q table, the prestack seismic data and the migration parameters.

Beneficial effects brought about by the embodiments of the present disclosure include, for example:

The embodiments of the present disclosure provide a data optimization method and an integral prestack depth migration method. The data optimization method includes: acquiring a target matrix to be optimized, wherein the target matrix is a traveltime table or an effective Q table; generating a first sequence according to the target matrix; rarefying the first sequence according to a preset grid density to obtain a value position of each element of a second sequence, and working out a value of each element of the second sequence on the basis of the principle of least squares, wherein the number of elements of the second sequence is far less than the number of elements of the first sequence; performing interpolation on the second sequence to obtain a third sequence, wherein the third sequence and the first sequence have the same number of elements; calculating a target matrix corresponding to the third sequence; calculating an error between the target matrix to be optimized and the target matrix corresponding to the third sequence; increasing, when the error is greater than a preset first error threshold, a grid density according to a preset rule, and continuing to perform the step of rarefying the first sequence according to the preset grid density to obtain the value position of each element of the second sequence; recording, when the error is less than the first error threshold, the target matrix corresponding to the above second sequence as an optimized target matrix of the target matrix to be optimized. With the data optimization method provided in the embodiments of the present disclosure, the optimized traveltime table and the effective Q table are introduced on the basis of the principle of least squares to approximate the traveltime table and the effective Q table in the implementation process of compensation medium absorption Kirchhoff prestack depth migration, and in the condition of satisfying the calculation precision, storage requirement to GPU hardware is reduced greatly, and the calculation efficiency of parallel calculation of compensation medium absorption Kirchhoff prestack depth migration based on the GPU is improved.

Other features and advantages of the present disclosure will be illustrated in the subsequent description, or some features and advantages may be deduced or undoubtedly determined from the description, or obtained by implementing the above technology of the present disclosure.

In order to make the above object, features and advantages of the present disclosure more apparent and understandable, preferred embodiments are particularly illustrated below to make following detailed description in combination with the accompanying drawings.

BRIEF DESCRIPTION OF DRAWINGS

In order to more clearly illustrate embodiments of the present disclosure or technical solutions in the prior art, accompanying drawings which need to be used for description of the embodiments or the prior art will be introduced briefly below, and apparently, the accompanying drawings in the following description merely show some embodiments of the present disclosure, and those ordinarily skilled in the art still could obtain other relevant accompanying drawings in light of these accompanying drawings, without using inventive effort.

DETAILED DESCRIPTION OF EMBODIMENTS

Figure 1:
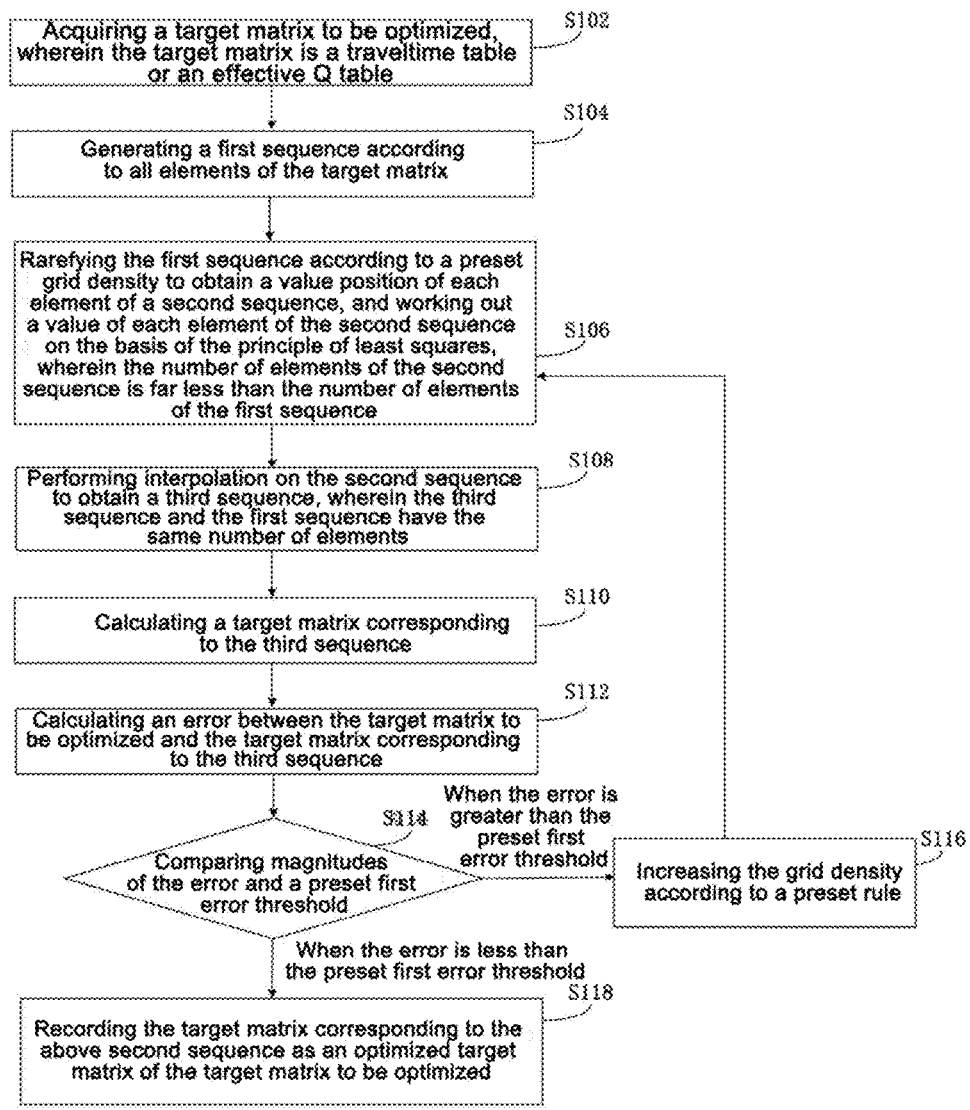
FIG. 1 is a schematic flowchart of a data optimization method provided in an embodiment of the present disclosure.

In order to make objects, technical solutions and advantages of the embodiments of the present disclosure clearer, the technical solutions of the present disclosure will be described clearly and completely below in conjunction with accompanying drawings, apparently, the described embodiments are merely some but not all embodiments of the present disclosure. All other embodiments obtained by those ordinarily skilled in the art, based on the embodiments of the present disclosure without any inventive efforts, shall fall within the scope of protection of the present disclosure.

As exploration targets are turned from shallowly buried and simply constructed reservoirs to deeply buried and complicatedly constructed reservoirs or lithological reservoirs, seismic exploration is also developed towards three-dimensional seismic exploration with wide-azimuth, broadband, and high-density. It is characterized by in field seismic acquisition, a series of fine measures such as wider azimuth, high folds of coverage, small bin, single-sensor or small array length are used. The high spatial and time sampling density data acquired poses great challenge to the seismic data processing technology.

As the most important step in a process of the seismic data processing technology, seismic migration imaging technology plays an important role in seeking complex structure, lithologic trap, oil-gas, fluid detection and so on. The challenge brought about by the high spatial and time sampling density data to the seismic prestack imaging lies mainly in two aspects:

The first one is a high storage capacity required by massive seismic data to a computer hard disk, and large memory and high calculation efficiency required by high folds of coverage to imaging point migration amplitude calculation in migration;

The second one is, theoretically, that seismic data received with a single-sensor or small array length has the advantage of broadband, but due to the earth's absorption effect in the seismic wave propagation process, especially for deeply buried targets, loss of high-frequency components of seismic event is quite great, thus leading to the result that the broadband advantage of the seismic data acquired in a single-sensor high-density cannot be taken, and low resolution of a seismic imaging.

In practice of existing seismic prestack migration methods, the integral prestack migration technology, represented by Kirchhoff method, predominates. The Kirchhoff method seismic prestack migration is mainly divided into two categories, namely, Kirchhoff prestack time migration and Kirchhoff prestack depth migration.

Viewing from specific implementation, a processing manner of Kirchhoff prestack time migration on a velocity model reflects to describe a propagation process of waves utilizing hyperbolic approximation; for a certain imaging point, by assuming that there exists a laterally uniform velocity model in a migration aperture scope to calculate the traveltime analytically, the calculation of the traveltime thereof is simple and efficient. But Kirchhoff prestack depth migration accounts for lateral velocity variation in a physically correct way: velocity information used thereby in the calculation of traveltime is an interval velocity model determined by the migration aperture scope, the velocity of this model varies laterally, and the corresponding traveltime calculation has to be carried out in a computationally intensive method such as ray tracing.

In order to overcome the disadvantage of heavy calculation quantity of the Kirchhoff prestack depth migration, people usually use a strategy of calculating and storing a traveltime table before migration, and looking-up corresponding traveltime from the traveltime table in migration to improve the calculation efficiency thereof. In practical application, selection of the two migration methods is also closely related to geological characteristics of the problem dealt with: for geological problem with a simple reflection structure or with a complex structure but no dramatic lateral velocity variations, the prestack time migration can perform imaging in a relatively good manner, but for a geological target with relatively strong lateral velocity variations, for example, deeply buried and complicatedly constructed reservoirs or lithologic reservoirs, the prestack depth migration method has to be used.

The Kirchhoff prestack time migration technology capable of exerting the broadband advantage of the high spatial and time sampling density data has been researched relatively fully. By newly introducing an effective Q parameter in the conventional Kirchhoff prestack time migration process, frequency division compensation is performed on the earth's absorption effect along a practical propagation path of seismic waves, then the broadband advantage of the data acquired in the single-sensor high-density can be brought into play, and high-resolution imaging of an exploration target can be achieved. In this technology of compensation medium absorption Kirchhoff prestack time migration, similar to the method of processing the velocity model, the absorption compensation of the imaging point is also merely related to the effective Q of this point. Therefore, although the frequency division migration amplitude calculation caused by the introduction of the effective Q brings about a huge calculation amount, we can utilize the GPU parallel calculation to greatly improve the calculation efficiency thereof, such that a calculation cycle thereof is controlled within an acceptable range. However, as mentioned in the preceding, this technology is not applicable to exploration of deeply buried and complicatedly constructed reservoirs or lithologic reservoirs.

The realization of the Kirchhoff prestack depth migration technology capable of exerting the broadband advantage of the high spatial and time sampling density data has a great obstacle of low calculation efficiency. This is mainly related to the implementation manner of this technology and characteristics of the GPU card. In order to realize the earth's absorption compensation to the seismic waves, we need to introduce the effective Q related to the seismic wave propagation path in the Kirchhoff prestack depth migration realization process, wherein the effective Q is related to Q values of all layers on the propagation path of the seismic waves from a shot point to an imaging point, and then to a receiver point. Therefore, in the technology of compensation medium absorption Kirchhoff prestack depth migration, in order to obtain a correct migration amplitude, apart from calculating and storing a traveltime table in advance, an effective Q table needs to be additionally stored.

However, for seismic data having high spatial and time sampling density with high folds of coverage, a traveltime table and an effective Q table thereof need a huge memory capacity, which is positively correlated to the folds of coverage thereof. In sharp contrast, the GPU card is mainly featured by good calculation, but has a quite limited memory.

At present, the strategy of reading the traveltime table and the effective Q by a CPU imaging point by imaging point, and then using communication between the CPU and the GPU so as to meet the requirement of the traveltime table and the effective Q when the GPU is utilized to calculate the imaging point migration amplitude, will greatly reduce the calculation efficiency of the GPU parallel calculation. Therefore, high-performance access of the traveltime table and the effective Q table are bottlenecks restricting compensation medium absorption the Kirchhoff prestack depth migration, which is an industrial application of the key technology of exploring complicatedly constructed reservoirs or lithologic reservoirs.

On this basis, the data optimization method and the integral prestack depth migration method provided in the embodiments of the present disclosure can approximate the initially larger "traveltime table and effective Q table" with smaller "traveltime table and effective Q table", and in a condition that calculation precision is met, the storage requirement to the GPU is greatly reduced, such that the efficiency of the parallel calculation of the technology of compensation medium absorption Kirchhoff integral prestack depth migration with GPU is improved to a great extent. Moreover, by the above data optimization method and the integral prestack depth migration method, industrial application of the technology of compensation medium absorption the Kirchhoff prestack depth migration can be efficiently achieved, the broadband advantage of high spatial and time sampling density seismic data is sufficiently and quickly tapped, the resolving power of such expensive seismic reflection data to complicated subsurface structures and lithologic reservoirs is improved, and more refined and accurate structural and fluid information on deep and super deep subsurface exploration targets is obtained, so as to render important application value to exploration of deep and super deep complicated structures and lithologic reservoirs.

In order to facilitate understanding to the present embodiment, first a data optimization method disclosed in the embodiment of the present disclosure is introduced in detail.

As shown in FIG. 1, it is a schematic flowchart of a data optimization method provided in an embodiment of the present disclosure. It can be seen from FIG. 1 that the optimization method includes following steps:

Step S102: acquiring a target matrix to be optimized, wherein the target matrix is a traveltime table or an effective Q table.

Herein, the object to be optimized is called a target matrix, and the target matrix may be a traveltime table, and also may be an effective Q table, wherein the traveltime table is a matrix about traveltimes, and the effective Q table is a matrix about effective Q values.

Taking the prestack depth migration processing of seismic data of a certain target working area as an example, specifically, optimization of a traveltime table and an effective Q table of an imaging point in an imaging space is illustrated, wherein each element in the traveltime table of any imaging point is corresponding to traveltime for the seismic waves to propagate from one shot point to this imaging point, moreover, each element in the effective Q table of this imaging point is corresponding to an effective Q for the seismic waves to propagate from one shot point to this imaging point.

Step S104: generating a first sequence according to the target matrix.

When this target matrix is a traveltime table, first the traveltime table is converted to a slowness table, and then the first sequence is generated according to all elements of the slowness table;

When this target matrix is an effective Q table, the first sequence is generated according to all elements of the effective Q table.

Step S106: rarefying the first sequence according to a preset grid density to obtain a value position of each element of a second sequence, and working out a value of each element of the second sequence on the basis of the principle of least squares, wherein the number of elements of the second sequence is far less than the number of elements of the first sequence.

Herein, by rarefying the first sequence with the preset grid density, a value position of each element of the second sequence in the first sequence can be obtained, but the value of each element of the second sequence is unknown. When the first sequence is rarefied, a relatively thin grid density usually will be set, such that the number of elements of the second sequence obtained from the rarefying is far less than the number of elements of the first sequence.

For each element in the second sequence, the value of each element can be worked out according to the principle of least squares. Specifically, all elements of the second sequence can be taken as a discrete point set, to approximate values of various elements of the first sequence using an interpolation algorithm, so as to determine a target function thereby. Herein, the interpolation algorithm may be linear interpolation, spline interpolation, kriging interpolation and so on; thereafter, a partial derivative is calculated for each element in the second sequence, and let the partial derivative of each element be 0, to obtain an equation set about each element; finally, the value of each element is obtained by solving the equation set. In this way, the second sequence that has been rarefied is obtained.

Step S108: performing interpolation on the second sequence to obtain a third sequence, wherein the third sequence and the first sequence have the same number of elements.

After the second sequence is obtained, the number of elements of the sequence is expanded utilizing the interpolation algorithm to obtain the third sequence, such that the number of elements of the third sequence is the same as the number of elements of the first sequence. Herein, the interpolation algorithm is the same as the interpolation algorithm applied in the above step S106.

Figure 2:
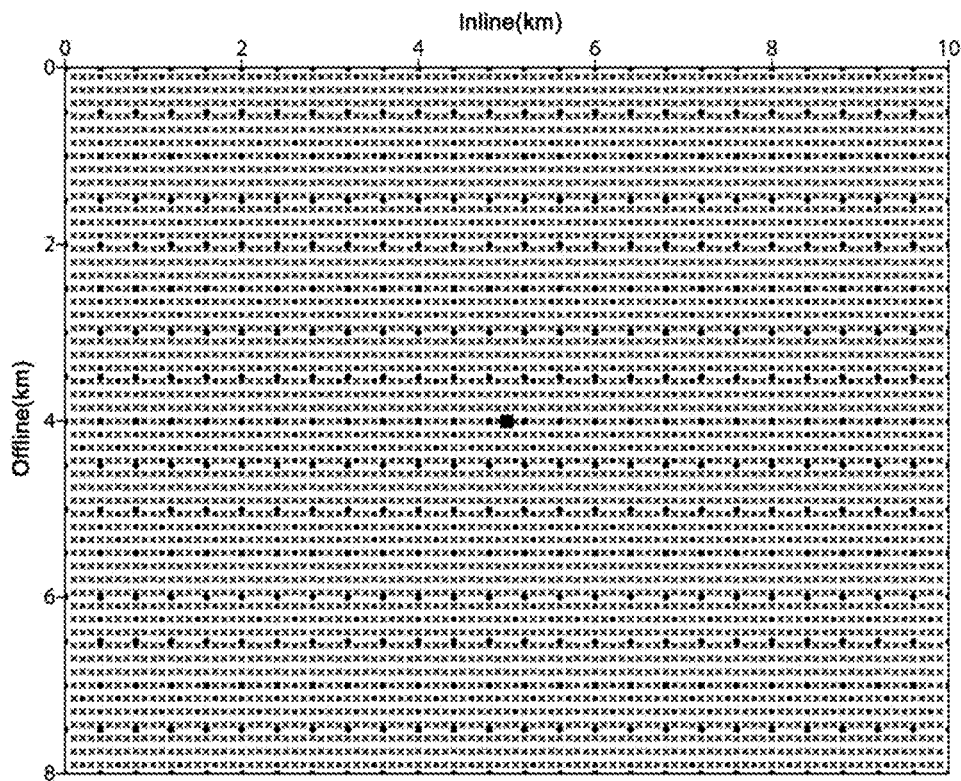
FIG. 2 is a schematic diagram of optimization of a traveltime table or an effective Q table of an imaging point provided in an embodiment of the present disclosure.

In order to understand operation of the above rarefying and interpolation in a better way, referring to FIG. 2, it is a schematic diagram of optimization of a traveltime table or an effective Q table of an imaging point provided in an embodiment of the present disclosure. In FIG. 2, a central black rectangle is a projection of an imaging point on the earth's surface, round points are point positions taken by the traveltime table or the effective Q table after the optimization, and black "X" signs are point positions taken by the traveltime table or the effective Q table before the optimization, wherein the optimization of the traveltime table or the effective Q table is to use the slowness values or effective Q values at the round points on the basis of the principle of least squares, using the interpolation algorithm to approximate slowness values or effective Q values at the black "X" signs.

Step S110: calculating a target matrix corresponding to the third sequence.

The second sequence is obtained through the operation of obtaining the element positions by the above rarefying and working out the element values by solving the equation set. Compared with the first sequence, the second sequence occupies a quite small space, but meanwhile also can approximate the first sequence through simple interpolation operation, facilitating replacing the first sequence with the second sequence to apply to some algorithms requiring strict spatial complexity, for example, apply to the GPU-based prestack depth migration algorithm. In this sense, the first sequence constituted by all elements of the target matrix is "optimized", forming the second sequence.

Herein, according to the third sequence, the corresponding traveltime table or the effective Q table thereof is calculated.

Step S112: calculating an error between the target matrix to be optimized and the target matrix corresponding to the third sequence.

In order to evaluate whether the second sequence obtained after the "optimization" meets the precision requirements, the error between the target matrix that is corresponding to the third sequence obtained through the application of the interpolation algorithm on the basis of the second sequence and the target matrix that is before the optimization needs to be calculated.

In one of the embodiments, the above step of calculating an error between the target matrix to be optimized and the target matrix corresponding to the third sequence includes:

Step 11: calculating an absolute value of a difference of corresponding elements in the target matrix corresponding to the third sequence and in the target matrix to be optimized;

Step 12: counting a percentage of the number of elements, having the absolute value of the difference greater than a preset deviation threshold, in the total number of elements of the target matrix to be optimized;

Step 13: taking the percentage as the error between the target matrix corresponding to the third sequence and the target matrix to be optimized.

Step S14: comparing magnitudes of the error and a preset first error threshold.

The above error obtained through calculation is compared with the preset first error threshold, wherein the first error threshold is used to measure a difference between the target matrix after the optimization and the target matrix before the optimization. In order to satisfy the calculation precision, the error between the target matrix before the optimization and the target matrix after the optimization needs to be controlled within a designed range.

Step S116: when the error is greater than the preset first error threshold, increasing the grid density according to a preset rule, and continuing to perform the step of rarefying the first sequence according to a preset grid density to obtain a value position of each element of a second sequence.

Herein, if the error between the target matrix to be optimized and the target matrix corresponding to the third sequence is greater than the preset first error threshold, it indicates that the optimization result is unsatisfactory yet, and the grid density for rarefying the first sequence needs to be increased, so as to increase the number of data taking part in the interpolation, thereby decreasing the error between the third sequence obtained by performing interpolation on the second sequence and the first sequence. At this time, the grid density can be increased according to the preset rule, and the step of rarefying the first sequence according to the preset grid density to obtain a value position of each element of a second sequence continues to be performed, that is, the above Step S106 to Step S114 are performed recurrently, as long as the error is still greater than the preset first error threshold, and by continuously increasing the grid density, the above error is enabled to continuously approximate the preset first error threshold.

Step S118: recording, when the error is less than the first error threshold, the target matrix corresponding to the above second sequence as an optimized target matrix of the target matrix to be optimized.

If the error between the target matrix to be optimized and the target matrix corresponding to the third sequence is less than the preset first error threshold, it indicates that the optimization result is satisfactory, at this time, the target matrix corresponding to the second sequence is recorded as the optimized target matrix of the target matrix to be optimized.

In this way, the traveltime table and the effective Q table can be optimized through the above method to obtain corresponding optimized traveltime table and optimized effective Q table.

In practical operations, since a seismic data imaging space of one working area is corresponding to a large quantity of imaging points, when the traveltime tables and the effective Q tables of the imaging points are optimized, in order to simplify the calculation process, in at least one possible embodiment, the imaging space can be divided into a plurality of imaging lines, each imaging line is divided into a plurality of imaging blocks, and each imaging block contains a plurality of imaging points, wherein for any imaging block, a typical imaging point within the imaging block can be selected to preferentially perform the above optimization operation, and when an optimized target matrix of the typical imaging point is obtained, sampling number and interval corresponding to the grid density for rarefying the sequence in a cycle of this time are correspondingly recorded as shared optimization parameters of the target matrix. In this way, the shared optimization parameters can be shared with other imaging points in the same imaging block to perform optimization operation, and when the traveltime tables and the effective Q tables of other imaging points are optimized, sequences are rarefied directly with this grid density, and it is defaulted that the optimization result satisfies the error requirement, thereby the time for each imaging point to perform recurrent calculation so as to obtain the grid density satisfying the error requirement is saved.

Figure 3A:
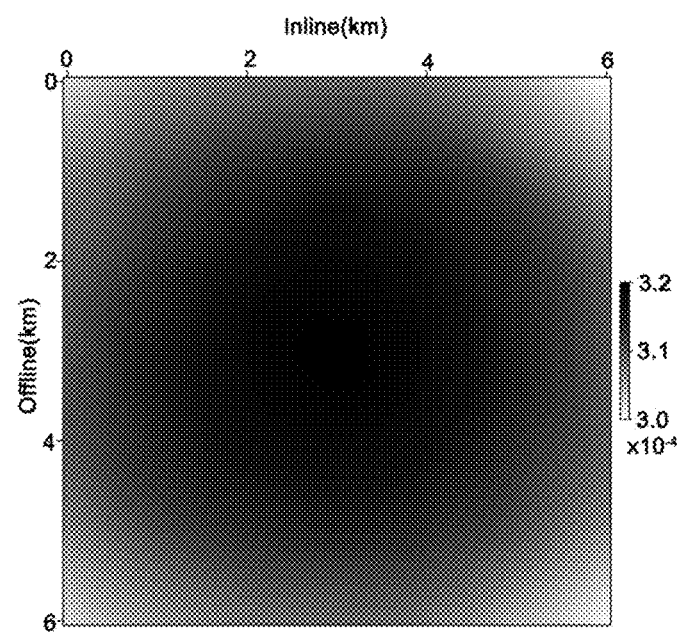
FIG. 3a, FIG. 3b, and FIG. 3c are schematic diagrams of slowness before optimization, slowness after optimization and then interpolation, and traveltime difference before and after optimization of a traveltime table of a 3 km-deep imaging point provided in an embodiment of the present disclosure respectively.
Figure 3B:
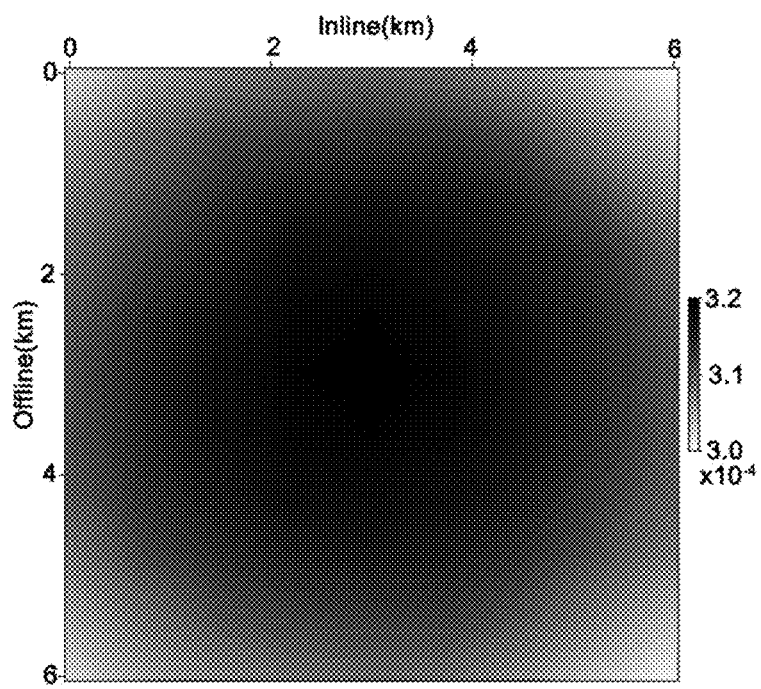
Figure 3C:
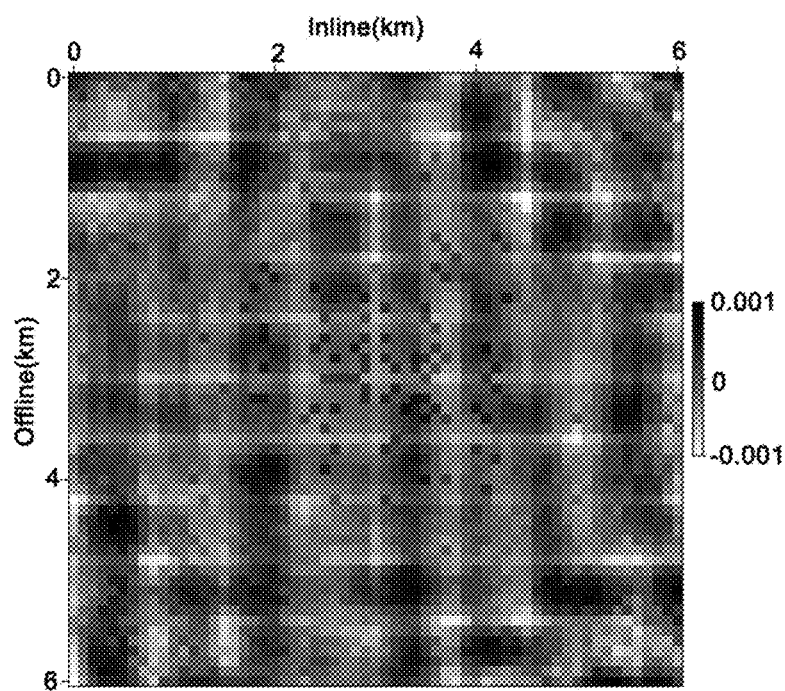

Referring to FIG. 3a, FIG. 3b, and FIG. 3c, they are schematic diagrams of slowness before optimization, slowness after optimization and then interpolation, and traveltime difference before and after optimization of a traveltime table of a 3 km-deep imaging point provided in an embodiment of the present disclosure respectively. In the above, FIG. 3a is a slowness distribution diagram obtained according to the traveltime table before the optimization, which occupies 61×61=3721 floating-point numerical values for storage; FIG. 3b is a slowness distribution diagram obtained by applying the interpolation algorithm on the basis of the slowness obtained from the optimized traveltime table stored, wherein only 11×9=99 short integer data need to be stored after optimization of the traveltime table, and the storage amount is decreased to 1.33% of the initial amount after the optimization of the traveltime table; FIG. 3c shows difference between the traveltime coverted from the slowness shown in FIG. 3a and FIG. 3b.

Figure 4A:
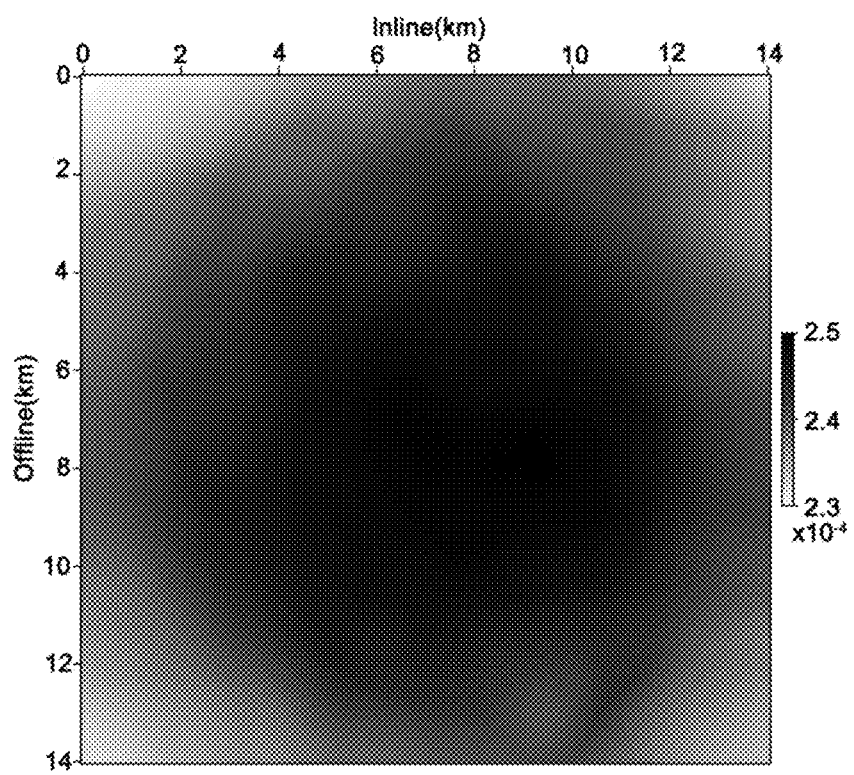
FIG. 4a, FIG. 4b, and FIG. 4c are schematic diagrams of slowness before optimization, slowness after optimization and then interpolation, and traveltime difference before and after optimization of a traveltime table of a 7 km-deep imaging point provided in an embodiment of the present disclosure respectively.
Figure 4B:
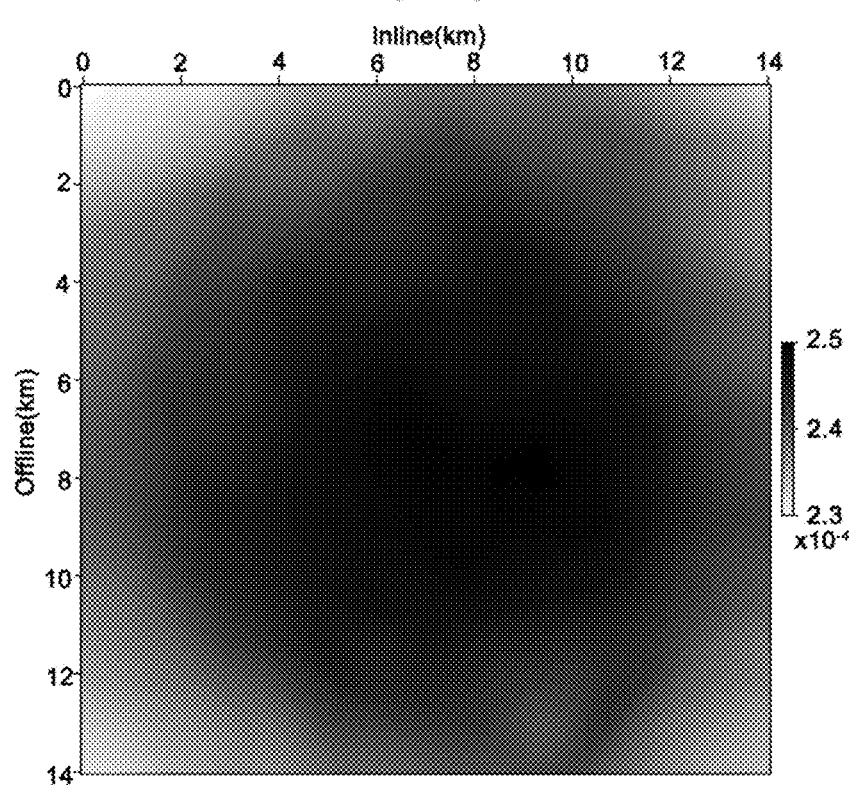
Figure 4C:
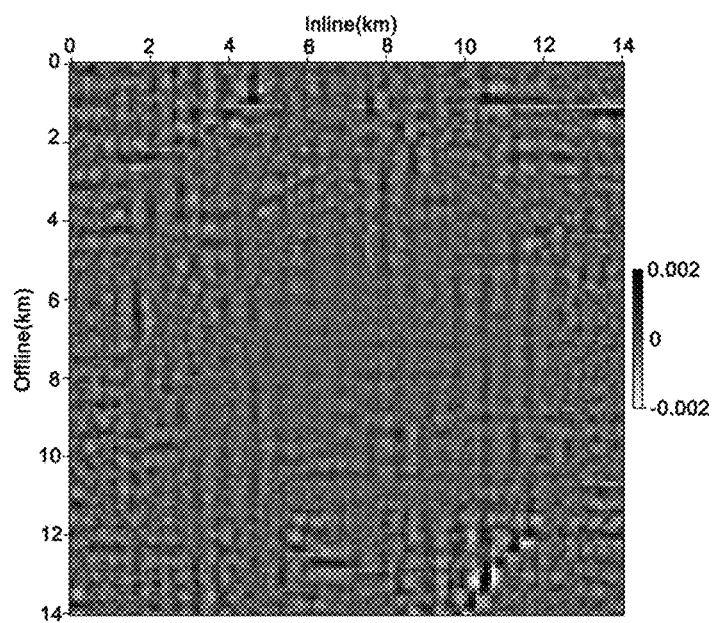

Referring to FIG. 4a, FIG. 4b, and FIG. 4c, they are schematic diagrams of slowness before optimization, slowness after optimization and then interpolation, and traveltime difference before and after optimization of a traveltime table of a 7 km-deep imaging point provided in an embodiment of the present disclosure respectively. In the above, FIG. 4a is a slowness distribution diagram obtained according to the traveltime table before the optimization, which occupies 141×141=19981 floating-point numerical values for storage; FIG. 4b is a slowness distribution diagram obtained by applying the interpolation algorithm on the basis of the slowness obtained from the optimized traveltime table stored, wherein only 39×39=1521 short integer data need to be stored after optimization of the traveltime table, and the storage amount is decreased to 3.83% of the initial storage amount after the optimization of the traveltime table; FIG. 4c shows difference between the traveltime coverted from the slowness shown in FIG. 4a and FIG. 4b.

It can be seen that with the data optimization method provided in the present embodiment, it can be realized that the smaller "traveltime table and effective Q table" approximate the initially larger "traveltime table and effective Q table", and in a condition that the calculation precision is met, storage requirement to the GPU is greatly reduced, in this way, the advantage of the GPU calculation can be fully exerted, such that the efficiency of parallel calculation of the technology of compensation medium absorption's Kirchhoff integral prestack depth migration with GPU is improved to a great extent.

The data optimization method provided in the embodiment of the present disclosure includes: acquiring the target matrix to be optimized, wherein the target matrix is a traveltime table or an effective Q table; generating the first sequence according to the target matrix; rarefying the first sequence according to the preset grid density to obtain the value position of each element of the second sequence, and working out the value of each element of the second sequence on the basis of the principle of least squares, wherein the number of elements of the second sequence is far less than the number of elements of the first sequence; performing interpolation on the second sequence to obtain a third sequence, wherein the third sequence and the first sequence have the same number of elements; calculating a target matrix corresponding to the third sequence; calculating an error between the target matrix to be optimized and the target matrix corresponding to the third sequence; when the error is greater than the preset first error threshold, increasing the grid density according to the preset rule, and continuing to perform the step of rarefying the first sequence according to the preset grid density to obtain the value position of each element of the second sequence; recording, when the error is less than the first error threshold, the target matrix corresponding to the above second sequence as an optimized target matrix of the target matrix to be optimized. In this method, the optimized traveltime table and the effective Q table are introduced on the basis of the principle of least squares to approximate the traveltime table and the effective Q table in the implementation process of compensation medium absorption Kirchhoff prestack depth migration, and in the condition of satisfying the calculation precision, storage requirement to GPU hardware is greatly reduced, and the calculation efficiency of parallel calculation of compensation medium absorption Kirchhoff prestack depth migration based on the GPU is improved.

In order to understand the process of the above data optimization method and effects after the optimization in a better manner, herein, optimization of the traveltime table and the effective Q table of an imaging point in an imaging space in the processing of seismic data prestack depth migration in a certain target working area is described.

For this target working area, an activation point traveltime table thereof is a set $\tau[nys_{total}, nxs_{total}, npy, npx, npz]$ of traveltime tables of all shot points within a plane range of the target working area, wherein $nys_{total}$ is the number of shot lines in the target working area, $nxs_{total}$ is the number of shots contained in each shot line in the target working area, wherein there are $nys_{total} \times nxs_{total}$ shots in total in the target working area, and npy, npx, npz are sampling numbers of an imaging space covered by each shot in Y-direction, X-direction, and Z-direction.

Herein, the shot point traveltime table refers to a set of traveltimes of seismic waves which are activated from a certain shot point $(y_s, x_s, 0)$ on the ground and propagated to all imaging points within a coverage range of seismic record of this shot, recorded as T [npy, npx, npz], wherein each element is defined as:

$$\tau_{y_s, x_s}(y_p, x_p, z_p) = \sum_{i=0}^{n} \frac{\Delta z_i}{v_i} = \sum_{i=0}^{n} \Delta \tau_i,$$

in the formula, n is the number of strata through which the seismic waves pass when being propagated to an imaging point with coordinates $(y_p, x_p, z_p)$, wherein $\Delta z_i$ denoting the thickness of the layer, and $v_i$ is the interval velocity of each layer.

Besides, the activation point effective Q table of the target working area refers to a set $Q[nys_{total}, nxs_{total}, npy, npx, npz]$ of effective Q tables of all shot points within a plane range of the target working area.

The shot point effective Q table refers to a set of effective Q values of seismic waves which are activated from a certain shot point $(y_s, x_s, 0)$ on the ground and propagated to all imaging points within a coverage range of seismic record of this shot, recorded as Q[npy, npx, npz], wherein each element is defined as:

$$Q_{y_s, x_s}(y_p, x_p, z_p) = \frac{1}{\sum_{i=0}^{n} \Delta \tau_i} \sum_{i=0}^{n} \frac{\Delta \tau_i}{q_i},$$

in the formula, n is the number of strata through which the seismic waves pass when being propagated to an imaging point with coordinates $(y_p, x_p, z_p)$, wherein $\Delta\tau_i$ is the one-way vertical traveltime that seismic waves propagated through each layer, and $q_i$ is the interval Q of each layer.

The imaging space ISPACE[ny, nx, nz] of the target working area is defined, wherein ny, nx, nz are the numbers of imaging points in y-direction, x-direction, and z-direction of the imaging space, respectively. Generally, nz=npz, ny>>npy, nx>>npx.

For a certain shot point of the target working area, it is recognized whether this shot point is within an effective imaging aperture range of the imaging point according to transverse coordinates $(y_s, x_s)$ of the shot point, transverse coordinates $(y_p, x_p)$ of the imaging point and the effective imaging aperture range of the imaging point, and if yes, traveltime $\tau_{y_s, x_s}(y_p, x_p, z_p)$ from this shot point to this imaging point is extracted from the activation point traveltime table $\tau[nys_{total}, nxs_{total}, npy, npx, npz]$ of the target working area according to the transverse coordinates $(y_s, x_s)$ of the shot point; and an effective Q $Q_{y_s, x_s}(y_p, x_p, z_p)$ along a propagation path of the seismic waves from this shot point to this imaging point is extracted from the activation point effective Q table $Q[nys_{total}, nxs_{total}, npy, npx, npz]$ of the target working area. Traversing $nys_{total} \times nxs_{total}$ shots in the target working area, the traveltime table $\tau_{y_p, x_p, z_p}[nys_P, nxs_P]$ and the effective Q table $Q_{y_p, x_p, z_p}[nys_P, nxs_P]$ of this imaging point are formed, wherein $nys_p$ and $nxs_p$ are the numbers of shot points in a y-direction and an x-direction contained in the effective imaging aperture range of this imaging point, respectively.

The traveltime table set of all imaging points within the imaging space constitutes the traveltime table $\tau[ny, nx, nz, nys_P, nxs_P]$ of the imaging space of the target working area. The effective Q table set of all imaging points within the imaging space constitutes the effective Q table $Q[ny, nx, nz, nys_P, nxs_P]$ of the imaging space of the target working area.

For any imaging point $(y_p, x_p, z_p)$ within the imaging space ISPACE [ny, nx, nz] of the target working area, each element in the traveltime table $\tau_{y_p, x_p, z_p}[nys_P, nxs_P]$ of the imaging point is corresponding to the traveltime of the seismic waves propagated from one shot point $(iys_P, ixs_P)$ to this imaging point.

(1) An element $\tau_{y_p, x_p, z_p}(iys_P, ixs_P)$ of the traveltime table of this imaging point is calculated according to a following formula:

$$Slow_{y_p, x_p, z_p}(iys_P, ixs_P) = \frac{\tau_{y_p, x_p, z_p}(iys_P, ixs_P)}{r_{y_p, x_p, z_p}(iys_P, ixs_P)}$$

In the formula, $r_{y_p, x_p, z_p}(iys_P, ixs_P)$ is a linear distance from this imaging point to the shot point $(iys_P, ixs_P)$, forming a slowness table $Slow_{y_p, x_p, z_p}[nys_P, nxs_P]$ of this imaging point, and obtaining a first slowness sequence $slow_i$, i=1, 2, 3, . . . $nys_P \times nxs_P$ containing $nys_P \times nxs_P$ digits from all elements of the slowness table.

(2) The above first slowness sequence is rarefied according to the preset grid density $$mxs_P \times mys_P \left( mxs_P \ll \frac{nxs_P}{3}, mys_P \ll \frac{nys_P}{3} \right),$$

and slowness values on the above $mxs_P \times mys_P$ shot point grid are worked out based on the principle of least squares to form a second slowness sequence $slow_i^{opti}$, i=1, 2, 3, . . . $mys_P \times mxs_P$;

Let a target function 1

$$F(slow_1^{opti}, slow_2^{opti} \ldots slow_{mxs_P \times mys_P}^{opti}) = \sum_{i=1}^{nys_P \times nxs_P} \left[ slow_i - \sum_{k=1}^{mxs_P \times mys_P} a_{ki} slow_k^{opti} \right]^2$$

be the minimal. In the formula, $a_{ki}$ is a weight coefficient determined by the imaging point coordinates, shot point coordinates, and the interpolation method used. An equation set about $slow_k^{opti}$, k=1, 2, 3, . . . $mys_P \times mxs_P$ can be obtained:

$$\sum_{j=1}^{mxs_P \times mys_P} a_{kj} slow_j^{opti} = b_k$$

In the formula:

$$a_{kj} = \sum_{i=1}^{nxs_P \times nys_P} a_{ji} a_{ki}, \quad b_k = \sum_{i=1}^{nxs_P \times nys_P} slow_i a_{ki}$$

Herein, letting the target function 1 be the minimal in the above is working out a partial derivative of $slow_k^{opti}(y_p, x_p, z_p)$, k=1, 2 . . . $mxs_P \times mys_P$ and letting the partial derivative be 0.

Solving this equation set can obtain slowness values on the $mxs_P \times mys_P$ shot point grid to form a second slowness sequence $slow_i^{opti}$, i=1, 2, 3, . . . $mys_P \times mxs_P$.

(3) A third slowness sequence $slow'_i = \sum_{k=1}^{mxs_P \times mys_P} a_{ki} slow_k^{opti}$, i=1, 2, 3, . . . $nys_P \times nxs_P$ of an initial $nys_P \times nxs_P$ shot point grid is obtained applying the interpolation algorithm on the basis of the second slowness sequence. In the formula, $a_{ki}$ is the same as the weight coefficient in step (2).

(4) On the basis of the third slowness sequence $slow'_i = \sum_{k=1}^{mxs_P \times mys_P} a_{ki} slow_k^{opti}$, i=1, 2, 3, . . . $nys_P \times nxs_P$ of an initial $nys_P \times nxs_P$ shot point grid obtained in step (3), a new slowness matrix $S_{y_p, x_p, z_p}^{cal}[nys_P, nxs_P]$ is formed by the third slowness sequence, and a new traveltime matrix $\tau_{y_p, x_p, z_p}^{cal}[nys_P, nxs_P]$ is obtained by applying the formula $\tau_{y_p, x_p, z_p}^{cal}(iys_P, ixs_P) = S_{y_p, x_p, z_p}^{cal}(iys_P, ixs_P) \times r_{y_p, x_p, z_p}(iys_P, ixs_P)$ to each element of the new slowness matrix.

(5) A difference between each element of the above new traveltime matrix $\pi_{y_p, x_p, z_p}^{cal}[nys_P, nxs_P]$ and the corresponding element of the initial matrix $\tau_{y_p, x_p, z_p}[nys_P, nxs_P]$ is worked out and statistically analyzed.

When the number of shots (elements) with an absolute value of the difference greater than 1 millisecond is greater than 1% of the total shot number (total number of matrix elements) $nys_P \times nxs_P$ of the effective imaging aperture range, the grid density $mxs_P$ and $mys_P$ are increased according to the preset rule. Herein, in one of the embodiments, for the above preset grid density $mxs_P \times mys_P$, both $mxs_P$ and $mys_P$ are odd numbers, and when the grid density is increased each time, two points are added in each of the x-direction and the y-direction.

After the grid density is increased, it returns back to the above step (2) again to recurrently calculate until the number of shots with the absolute value of the above difference greater than 1 millisecond is less than 1% of the total shot number $nys_P \times nxs_P$ within the effective imaging aperture range, at this time, sampling number and interval corresponding to the grid density meeting the requirements are recorded as shared optimization parameters of the traveltime tables. Specifically, the sampling number $mxs_P$ is recorded as $mx_P^\tau$, and $mys_P$ is recorded as $my_P^\tau$, meanwhile, the intervals $dx_P^\tau$ and $dy_P^\tau$ of the shot point grid of the traveltime table at this time are recorded. Herein, $mx_P^\tau$, $my_P^\tau$, $dx_P^\tau$, and $dy_P^\tau$ are shared optimization parameters of the traveltime tables.

Similarly, an optimization process of the effective Q table of the above imaging point $(y_p, x_p, z_p)$ is as follows.

Wherein, each element in the effective Q table $Q_{y_p, x_p, z_p}[nys_P, nxs_P]$ of this imaging point is corresponding to the effective Q of the seismic waves propagated from one shot point $(iys_P, ixs_P)$ to this imaging point.

(6) All elements in the effective Q table of this imaging point constitute a first effective Q sequence $Q_i$, i=1, 2, 3, ... $nys_P \times nxs_P$ containing $nys_p \times nxs_P$ digits.

(7) The above first effective Q sequence is rarefied according to the preset grid density $$mxs_P \times mys_P \left( mxs_P \ll \frac{nxs_P}{5}, \ mys_P \leq \frac{nys_P}{5} \right),$$

and effective Q values on the above $mxs_P \times mys_P$ shot point grid are worked out based on the principle of least squares to form a second effective Q sequence $Q_i^{opti}$, i=1, 2, 3, ... $mys_P \times mxs_P$;

Let a target function 2:

$$F'\left(Q_1^{opti}(y_p, x_p, z_p), Q_2^{opti}(y_p, x_p, z_p) \ldots Q_{mxs_P \times mys_P}^{opti}(y_p, x_p, z_p)\right) = \sum_{i=1}^{nys_P \times nxs_P} \left[ Q_i(y_p, x_p, z_p) - \sum_{k=1}^{mxs_P \times mys_P} a_{ki} Q_k^{opti}(y_p, x_p, z_p) \right]^2$$

be the minimal. In the formula, $a_{ki}$ is a weight coefficient determined by the imaging point coordinates, shot point coordinates, and the interpolation method applied. An equation set about $Q_k^{opti}(y_p, x_p, z_p)$, k=1, 2 ... $mxs_P \times mys_P$ can be obtained:

$$\sum_{j=1}^{mxs_P \times mys_P} a_{kj} Q_j^{opti}(y_p, x_p, z_p) = d_k(y_p, x_p, z_p)$$

In the formula:

$$a_{kj} = \sum_{i=1}^{nxs_P \times nys_P} a_{ji} a_{ki},$$

$$d_k(y_p, x_p, z_p) = \sum_{i=1}^{nxs_P \times nys_P} Q_i(y_p, x_p, z_p) a_{ki}$$

Herein, letting the target function 2 be the minimal in the above is working out a partial derivative of $Q_k^{opti}(y_p, x_p, z_p)$, k=1, 2 ... $mxs_P \times mys_P$ and letting the partial derivative be 0.

Working out this equation set can obtain the second effective Q sequence $Q_i^{opti}$, i=1, 2, 3, ... $mys_P \times mxs_P$, which is constituted by effective Q values on the $mxs_P \times mys_P$ shot point grid at the imaging point with coordinates $(y_p, x_p, z_p)$.

(8) A third effective Q sequence $Q'_i = \sum_{k=1}^{mxs_P \times mys_P} a_{ki} Q_k^{opti}$, i=1, 2, 3, ... $nys_P \times nxs_P$ of the initial $nys_P \times nxs_P$ shot point grid is obtained applying the interpolation algorithm on the basis of the second effective Q sequence. In the formula, $a_{ki}$ is the same as the weight coefficient in step (7).

(9) A new effective Q matrix $Q_{y_p, x_p, z_p}^{cal}[nys_P, nxs_P]$ is formed by the effective Q sequence $Q'_i = \sum_{k=1}^{mxs_P \times mys_P} a_{ki} Q_k^{opti}$, i=1, 2, 3, ... $nys_P \times nxs_P$ on the initial $nys_P \times nxs_P$ shot point grid obtained on the basis of step (8).

(10) A difference between each element of the new effective Q matrix $Q_{y_p, x_p, z_p}^{cal}[nys_P, nxs_P]$ and the corresponding element of the initial matrix $Q_{y_p, x_p, z_p}[nys_P, nxs_P]$ is worked out and statistically analyzed;

When the number of shots (elements) with an absolute value of the difference greater than 5 is greater than 1% of the total shot number (total number of the matrix elements) $nys_P \times nxs_P$ within the effective imaging aperture range, the values of $mxs_p$, $mys_p$ in $mxs_P \times mys_P$ are increased according to a preset rule, and it again returns back to step (7) to recurrently calculate until the number of shots with the absolute value of the above difference greater than 5 is less than 1% of the total number of shots $nys_P \times nxs_P$ within the effective imaging aperture range, and sampling number and interval corresponding to the grid density meeting the requirements are recorded as shared optimization parameters. Specifically, the sampling number $mxs_p$ is recorded as $mx_P^Q$, and $mys_p$ is recorded as $my_P^Q$, meanwhile, the intervals $dx_P^Q$ and $dy_P^Q$ of the effective Q table shot point grid at this time are recorded. Herein, $mx_P^Q$, $my_P^Q$, $dx_P^Q$, and $dy_P^Q$ are shared optimization parameters of the effective Q table.

In this way, the optimized traveltime table and the optimized effective Q table of any imaging point within the imaging space ISPACE[ny, nx, nz] of the target working area can be obtained through the above steps.

In practical operations, in order to simplify a calculation process, the imaging space can be divided into a plurality of imaging lines, each imaging line is divided into a plurality of imaging blocks, and each imaging block contains a plurality of imaging points, wherein for any imaging block, a typical imaging point within the imaging block can be selected to preferentially perform the above optimization operation, and when the optimized traveltime table and the optimized effective Q table of the typical imaging point are obtained, the traveltime table shared optimization parameters and effective Q table shared optimization parameters of this typical imaging point are correspondingly recorded. In this way, the shared optimization parameters can be shared with other imaging points in the same imaging block to perform optimization operation, so as to save the time for performing recurrent calculation for other imaging points in the imaging block to obtain the grid density satisfying the error requirement. Specifically, the operations are as follows:

First, according to coordinates of an imaging point y contained within an imaging space ISPACE [ny, nx, nz] of the target working area, an imaging space traveltime table $\tau[ny, nx, nz, nys_P, nxs_P]$ of this target working area is divided into a traveltime table set $\tau_{iy}[nx, nz, nys_P, nxs_P]$, iy=1, 2, 3 ... ny of different imaging lines. An imaging space effective Q table $Q[ny, nx, nz, nys_P, nxs_P]$ of this target working area is divided into an effective Q table set $Q_{iy}[nx,$ nz, nys$_P$, nxs$_P$], iy=1, 2, 3 . . . ny of different imaging lines. Each imaging line contains nx×nz imaging points.

Second, for each imaging line, according to lateral and vertical variations of velocity on the imaging points contained therein in the x-direction and the z-direction, it is divided into mx$_b$×mz$_b$ imaging blocks, and for each imaging block, the sampling number in the x-direction is nx$_b$, and the sampling number in the z-direction is nz$_b$.

Thereafter, for a certain imaging block of a certain imaging line within the imaging space ISPACE [ny, nx, nz] of the target working area, a typical imaging point within the imaging block is selected according to condition 1, wherein the condition 1 is: z coordinate of the imaging point is maximal and velocity lateral gradient is maximal.

For any imaging block, after the typical imaging point thereof is selected, the traveltime table shared optimization parameters mx$_P^\tau$ and my$_P^\tau$ of this typical imaging point and effective Q table shared optimization parameters mx$_P^Q$ and my$_P^Q$ thereof are obtained through the above steps (1) to (10).

Herein, the same traveltime table optimization parameters mx$_P^\tau$ and my$_P^\tau$ are shared within the imaging block where the typical imaging point is located, let mxs$_P$=mx$_P^\tau$, and mys$_P$=my$_P^\tau$, steps (1)-(2) are applied to any imaging point within the imaging block where the typical imaging point is located to obtain an optimized slowness sequence slow$_i^{opti}$ (y$_p$, x$_p$, z$_p$), i=1, 2, 3, . . . my$_P^\tau$×mx$_P^\tau$ of this imaging block, wherein in the formula, (y$_p$, x$_p$, z$_p$) is spatial coordinates of an imaging point within the imaging block. Then $\tau_i^{opti}$(y$_p$, x$_p$, z$_p$)=slow$_i^{opti}$(y$_p$, x$_p$, z$_p$)×r$_i$(y$_p$, x$_p$, z$_p$) is applied to obtain an optimized traveltime table $\tau_{y_p, x_p, z_p}^{opti}$[my$_P^\tau$, mx$_P^\tau$] of each imaging point, wherein in the formula, r$_i$(y$_p$, x$_p$, z$_p$) is a linear distance from an i$^{th}$ shot point to an imaging point (y$_p$, x$_p$, z$_p$).

Traversing all imaging points within the imaging block where the above typical imaging point is located, the optimized traveltime table $\tau^{opti}$[nx$_b$, nz$_b$, my$_P^\tau$, mx$_P^\tau$] of this imaging block is obtained.

Likewise, the same effective Q table optimization parameters mx$_P^Q$ and my$_P^Q$ are shared within the imaging block where the above typical imaging point is located, let mxs$_P$=mx$_P^q$, and mys$_P$=my$_P^Q$, steps (6)-(7) are applied to any imaging point within the imaging block where the typical imaging point is located to obtain an optimized effective Q sequence Q$_i^{opti}$(y$_p$, x$_p$, z$_p$), i=1, 2, 3, . . . my$_P^Q$×mx$_P^Q$ of this imaging point, and an optimized effective Q table Q$_{y_p, x_p, z_p}^{opti}$[my$_P^Q$, mx$_P^Q$] of this imaging point is formed, wherein in the formula, (y$_p$, x$_p$, z$_p$) is spatial coordinates of this imaging point.

Traversing all imaging points within the imaging block where this typical imaging point is located, the optimized effective Q table Q$_{opti}$[nx$_b$, nz$_b$, my$_P^Q$, mx$_P^Q$] of this imaging block is obtained.

Likewise, traversing all imaging blocks of the above imaging line, the optimized traveltime table and the optimized effective Q table of this imaging line are obtained.

Moreover, traversing all imaging lines within the imaging space ISPACE[ny, nx, nz] of the target working area, the optimized traveltime table and the optimized effective Q table of the imaging space ISPACE[ny, nx, nz] of this target working area can be obtained.

Figure 5:
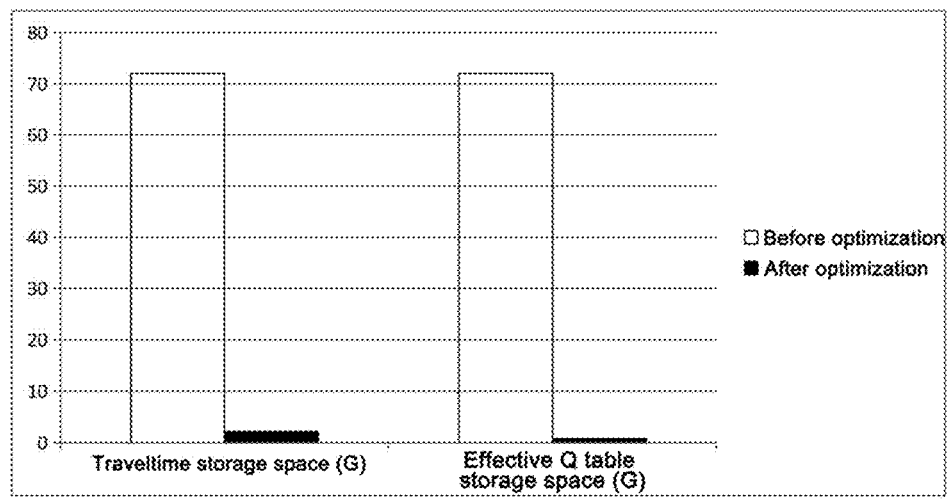
FIG. 5 is a comparison schematic diagram of storage spaces of a traveltime table and an effective Q table of a certain imaging line, before and after optimization, provided in an embodiment of the present disclosure.

Referring to FIG. 5, it is a comparison schematic diagram of storage spaces before and after optimization of a traveltime table and an effective Q table of a certain imaging line provided in an embodiment of the present disclosure, wherein this imaging line has 1124 sampling points in an X-direction, and 2000 sampling points in a Z-direction, containing 2248000 imaging points in total, and has a traveltime table with a size of 72.03 G before optimization, which is reduced to 2.2 G after optimization, and has an effective Q table with a size of 72.03 G before optimization, which is reduced to 0.79 G after optimization.

It can be seen from the effect shown in FIG. 5 that, through the optimization method for the traveltime table and the effective Q table provided in the embodiment of the present disclosure, the requirements of the traveltime table and the effective Q table of the imaging line to the storage space can be greatly reduced.

Figure 6:
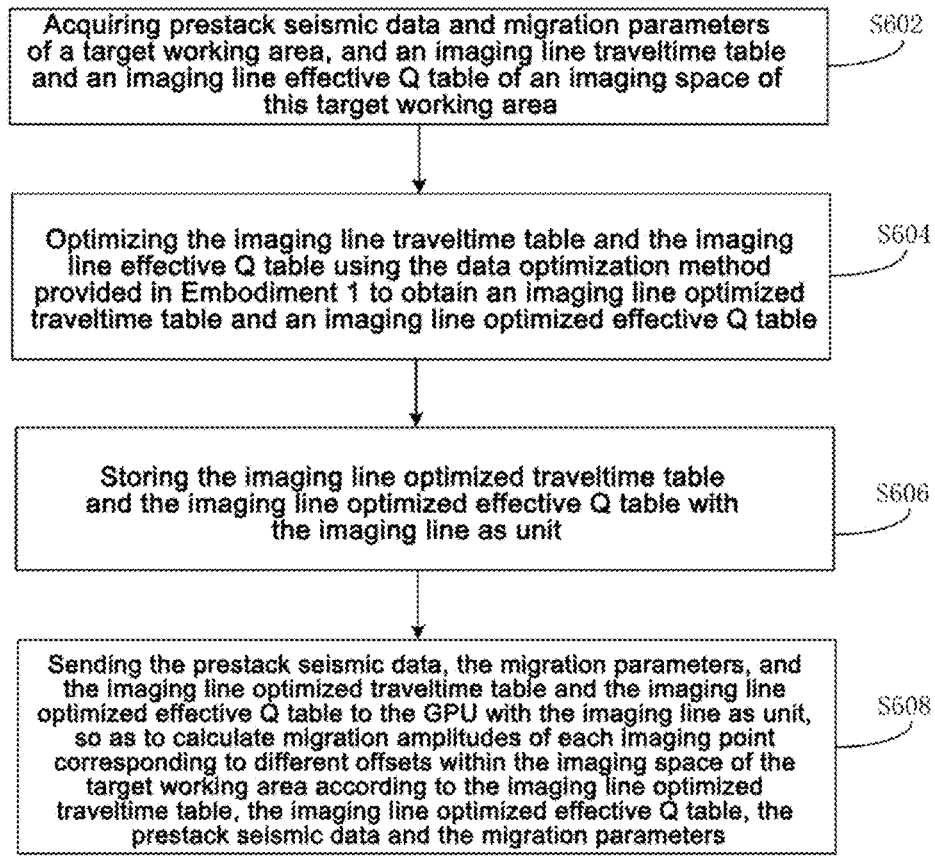
FIG. 6 is a schematic flowchart of an integral prestack depth migration method provided in an embodiment of the present disclosure.

An embodiment of the present disclosure further provides an integral prestack depth migration method, which is applied to a CPU. Referring to FIG. 6, it is a schematic flowchart of the method, and as can be seen from FIG. 6, this method includes following steps:

Step S602: acquiring prestack seismic data and migration parameters of a target working area, and an imaging line traveltime table and an imaging line effective Q table of an imaging space of this target working area.

Herein, the imaging space of the target working area is divided into a plurality of imaging lines, each of the imaging lines is divided into a plurality of imaging blocks, and each imaging block contains a plurality of imaging points.

Step S604: optimizing the imaging line traveltime table and the imaging line effective Q table using the data optimization method provided in the above embodiment to obtain an imaging line optimized traveltime table and an imaging line optimized effective Q table.

Taking the imaging line as an unit in a CPU, the imaging line traveltime tables and the imaging line effective Q tables corresponding to the imaging lines are optimized line by line, to obtain an imaging line optimized traveltime table and an imaging line optimized effective Q table corresponding to each imaging line. Herein, for the optimization steps and processes of the imaging line traveltime tables and the imaging line effective Q tables, reference can be made to the corresponding contents in the above embodiments, and unnecessary details will not be given herein.

Step S606: storing the imaging line optimized traveltime table and the imaging line optimized effective Q table with the imaging line as an unit.

The imaging line optimized traveltime table and the imaging line optimized effective Q table corresponding to each imaging line obtained after the optimization are stored in the CPU with the imaging line as an unit.

Specifically, the above step of storing the imaging line optimized traveltime table and the imaging line optimized effective Q table with the imaging line as an unit includes:

First, constructing a first index file of the imaging line optimized traveltime table and a second index file of the imaging line optimized effective Q table with the imaging line as an unit, wherein the first index file includes an imaging block dividing parameter of the imaging line, a shared traveltime table optimization parameter within each imaging block, and a storage position of an optimized traveltime table of a first imaging point within each imaging block in a data file of the imaging line optimized traveltime table. Moreover, the second index file includes an imaging block dividing parameter, a shared effective Q table optimization parameter within the imaging block, and a storage position of an optimized effective Q of a first imaging point within each imaging block in a data file of the imaging line optimized effective Q table.

Second, storing the first index file and the second index file, and storing the data file of the imaging line optimized traveltime table and the data file of the imaging line optimized effective Q table in an unsigned short integer variable type.

Herein, according to a first relation and a second relation, the data file of the imaging line optimized traveltime table and the data file of the imaging line optimized effective Q table are respectively stored as for individual imaging blocks. The first relation is:

$$\tau^{GPU}[imx_P^\tau, imy_P^\tau, ixi, izi] = \text{(unsigned short int)}(\tau^{opti}[ixi, izi, imx_P^\tau, imy_P^\tau] \times k + b)$$

the second relation is:

$$Q^{GPU}[imx_P^Q, imy_P^Q, ixi, izi] = \text{(unsigned short int)}(Q^{opti}[ixi, izi, imx_P^Q, imy_P^Q]),$$

in the formula: ixi is an x-direction index of a position of an imaging point within an imaging block, izi is a z-direction index of the position of the imaging point within the imaging block, $imx_P^\tau$, is an x-direction index of a shot point in an imaging point optimized traveltime table, $imy_P^\tau$ is a y-direction index of the shot point in the imaging point optimized traveltime table, $imx_P^Q$ is an x-direction index of a shot point in an imaging point optimized effective Q table, $imy_P^Q$ is a y-direction index of the shot point in the imaging point optimized effective Q table; k is $$\frac{\max\tau}{65535},$$

max $\tau$ is a maximal value of the traveltime in an imaging space optimized traveltime table of the target working area, b is 0.0; $\tau^{GPU}[imx_P^\tau, imy_P^\tau, ixi, izi]$ represents a storage order of data files of the imaging block optimized traveltime table; $\tau^{opti}[ixi, izi, imx_P^\tau, imy_P^\tau]$ represents a data format of the imaging block optimized traveltime table; $Q^{opti}[ixi, izi, imx_P^Q, imy_P^Q]$ represents a data format of the imaging block optimized effective Q table; $Q^{GPU}[imx_P^Q, imy_P^Q, ixi, izi]$ represents a storage order of data files of the imaging block optimized effective Q table.

Herein, when storing the data files, for a certain imaging block, there is an operation of array sequential rearrangement, aiming at improving a reading speed of a GPU thread on the data files of the traveltime table and the effective Q table, and the storage strategy of storing the optimized traveltime table and the optimized effective Q table in an unsigned short integer data format according to the first and second relation can reduce half requirements to the memory of the GPU card in a situation of meeting the requirement of calculation precision.

When the GPU carries out the integral prestack depth migration calculation, the CPU reads the above imaging line optimized traveltime table and the imaging line optimized effective Q table with the imaging line as an unit.

Step S608: sending to the GPU the prestack seismic data, the migration parameters, and the imaging line optimized traveltime table and the imaging line optimized effective Q table, with the imaging line as an unit, so as to calculate migration amplitudes of each imaging point corresponding to different offsets within the imaging space of the target working area according to the imaging line optimized traveltime table, the imaging line optimized effective Q table, the prestack seismic data and the migration parameters.

When the prestack migration is calculated, the CPU first sends the prestack seismic data and the migration parameters to the GPU, then sends the imaging line optimized traveltime table and the imaging line optimized effective Q table to the GPU with the imaging line as an unit. In one embodiment thereof, the GPU only receives the imaging line optimized traveltime table and the imaging line optimized effective Q table of one imaging line at one time, and calculates the migration amplitudes of different offsets corresponding to each imaging point in the imaging line according to the imaging line optimized traveltime table, the imaging line optimized effective Q table, the prestack seismic data and the migration parameters, and after this imaging line is calculated, the imaging line optimized traveltime table and the imaging line optimized effective Q table corresponding to a next imaging line are received to perform a new round of calculation, which is repeated, until the migration amplitudes of different offsets corresponding to each imaging point in the imaging space of the target working area are calculated.

Figure 7:
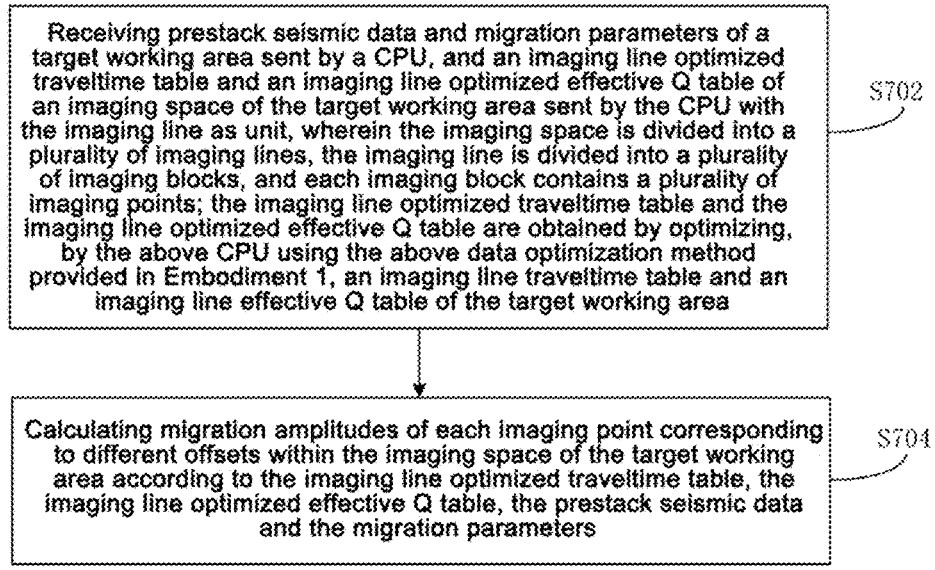
FIG. 7 is a schematic flowchart of another integral prestack depth migration method provided in an embodiment of the present disclosure.

Referring to FIG. 7, it shows another integral prestack depth migration method provided in an embodiment of the present disclosure, which is applied to a GPU. As can be seen from FIG. 7, this method includes following steps:

Step S702: receiving prestack seismic data and migration parameters of a target working area sent by a CPU, and an imaging line optimized traveltime table and an imaging line optimized effective Q table of an imaging space of the target working area sent by the CPU with the imaging line as an unit, wherein the imaging space is divided into a plurality of imaging lines, each of the imaging lines is divided into a plurality of imaging blocks, and each imaging block contains a plurality of imaging points; the imaging line optimized traveltime table and the imaging line optimized effective Q table are obtained by optimizing, by the above CPU using the above data optimization method provided in the embodiment of the present disclosure, an imaging line traveltime table and an imaging line effective Q table of the target working area.

When the prestack migration is calculated using the present method, in one of the possible embodiments, the CPU and the GPU calculate in parallel cooperatively, at this time, the GPU can acquire the prestack seismic data and the migration parameters of the target working area from the CPU, and moreover, the GPU only receives the imaging line optimized traveltime table and the imaging line optimized effective Q table of one imaging line at one time, and calculates the migration amplitudes of each imaging point corresponding to different offsets in the imaging line according to the imaging line optimized traveltime table, the imaging line optimized effective Q table, the prestack seismic data and the migration parameters, and after this imaging line is calculated, the imaging line optimized traveltime table and the imaging line optimized effective Q table corresponding to a next imaging line are received to perform a new round of calculation.

For the imaging space of the above target working area, the imaging space is divided into a plurality of imaging lines, each of the imaging lines is divided into a plurality of imaging blocks, and the imaging block contains a plurality of imaging points. Herein, for the optimization steps and processes of the imaging line traveltime table and the imaging line effective Q table, reference can be made to the corresponding contents in the above embodiment, and unnecessary details will not be given herein.

Step S704: calculating migration amplitudes of each imaging point corresponding to different offsets within the imaging space of the target working area according to the imaging line optimized traveltime table, the imaging line optimized effective Q table, the prestack seismic data and the migration parameters.

After the GPU receives the imaging line optimized traveltime table and the imaging line optimized effective Q table to be calculated with the imaging line as an unit, in combination with the prestack seismic data and the migration parameters, the migration amplitudes of each imaging point corresponding to different offsets can be calculated, and in at least one possible embodiment, the above step of calculating the migration amplitude includes:

Step 31: acquiring shot point coordinates and receiver point coordinates of a prestack seismic trace.

Step 32: determining a size of a GPU block and a size of a GPU grid.

Step 33: calculating a thread index of each imaging point in the imaging line according to the size of the GPU block and the size of the GPU grid, wherein the thread index includes a depth position index and a transverse position index.

Step 34: thread-reading a first index file and a second index file of the imaging line according to the thread index, to determine a traveltime table optimization parameter and an effective Q table optimization parameter of an imaging block where each imaging point is located, and a storage position of an optimized traveltime table of a first imaging point within the imaging block where the imaging point is located in a data file of the imaging line optimized traveltime table, and a storage position of an optimized effective Q table of the first imaging point within the imaging block where the imaging point is located in a data file of the imaging line optimized effective Q table.

Step 35: thread-acquiring traveltime and an effective Q from a shot point corresponding to the prestack seismic trace to the imaging point, and traveltime and an effective Q table from a receiver point corresponding to the prestack seismic trace to the imaging point, according to the shot point coordinates, the receiver point coordinates, as well as the first index file and the second index file corresponding to the imaging line, and a data file of the imaging line optimized traveltime table and a data file of the imaging line optimized effective Q table.

Herein, the step of thread-acquiring traveltime from a shot point corresponding to the prestack seismic trace to the imaging point and traveltime from a receiver point corresponding to the prestack seismic trace to the imaging point includes:

Calculating, according to the shot point coordinates, the receiver point coordinates, the traveltime table optimization parameter and the traveltime table shot point grid interval, a first grid of the optimized traveltime table corresponding to the shot point coordinates as well as first index values of four vertexes of the first grid, and a second grid of the optimized traveltime table corresponding to the receiver point coordinates as well as second index values of four vertexes of the second grid;

Calculating, according to the first index value and the second index value, first position and second position of traveltimes of the four vertexes of the first grid and the four vertexes of the second grid in the data files of the imaging line optimized traveltime table, respectively, and reading the traveltimes of the four vertexes of the first grid and the traveltimes of the four vertexes of the second grid according to the first position and the second position;

Calculating slowness values of the four vertexes of the first grid, and slowness values of the four vertexes of the second grid, respectively, according to the traveltimes of the four vertexes of the first grid and the traveltimes of the four vertexes of the second grid; interpolating according to the slowness values of the four vertexes of the first grid and the slowness values of the four vertexes of the second grid, respectively, to obtain a first slowness value and a second slowness value of the imaging point;

Calculating the traveltime from the shot point corresponding to the prestack seismic trace to the imaging point, and the traveltime from the receiver point corresponding to the prestack seismic trace to the imaging point, respectively, according to the first slowness value and the second slowness value.

Besides, the step of thread-acquiring an effective Q from a shot point corresponding to the prestack seismic trace to the imaging point and an effective Q from a receiver point corresponding to the prestack seismic trace to the imaging point includes:

Calculating, according to the shot point coordinates, the receiver point coordinates, the effective Q table optimization parameter and an effective Q table shot point grid interval, a third grid of the optimized effective Q table corresponding to the shot point coordinates as well as third index values of four vertexes of the third grid, and a fourth grid of the optimized effective Q table corresponding to the receiver point coordinates as well as fourth index values of four vertexes of the fourth grid;

Calculating, according to the third index values and the fourth index values, third position and fourth position of the effective Q values of the four vertexes of the third grid and the four vertexes of the fourth grid in the data files of the imaging line optimized effective Q table, and reading the effective Q values of the four vertexes of the third grid, and the effective Q values of the four vertexes of the fourth grid according to the third position and the fourth position;

Interpolating according to effective Q values of the four vertexes of the third grid, and the effective Q values of the four vertexes of the fourth grid respectively to obtain the effective Q from the shot point corresponding to the prestack seismic trace to the imaging point, and the effective Q from the receiver point corresponding to the prestack seismic trace to the imaging point.

Step 36: thread-calculating a migration amplitude of each imaging point according to an imaging formula, wherein the imaging formula is:

$$I(h, x_p, y_p, z_p) = \frac{\tau_g r_s^3}{\tau_s r_g^3} \int F(\omega)\omega \exp\left(-j\frac{\pi}{2}\right) \exp\left[j\omega(\tau_s + \tau_g) - \left(\frac{\tau_s}{Q_s} + \frac{\tau_g}{Q_g}\right)\frac{\ln(\omega/\omega_0)}{\pi}\right] \exp\left\{\frac{\omega}{2}\left(\frac{\tau_s}{Q_s} + \frac{\tau_g}{Q_g}\right)\right\} d\omega.$$

In the formula: $I(h, x_p, y_p, z_p)$ is a migration amplitude of the imaging point, h is a prestack seismic trace offset, j is an imaginary part unit, $\omega$ is a frequency, $\omega_0$ is a seismic data dominant frequency, $F(\omega)$ is a sequence for the prestack seismic trace converted to a frequency domain, $r_s, r_g$ are distances from the shot point and the receiver point corresponding to the prestack seismic trace to the imaging point respectively, $\tau_s$ and $Q_s$ are traveltime and an effective Q from the shot point corresponding to the prestack seismic trace to the imaging point respectively, and $\tau_g$ and $Q_g$ are traveltime and an effective Q from the receiver point corresponding to the prestack seismic trace to the imaging point respectively.

In the integral prestack depth migration method provided in the present disclosure, the imaging space is divided, wherein one imaging line is divided into a plurality of imaging blocks, different imaging blocks may have different optimization parameters, which not only reduces the storage space for the traveltime tables and the effective Q tables of the imaging line, but also can be adapted to nonuniform variations of structure within an area of the imaging line. Moreover, by introducing the short integer datatype to store the optimized traveltime tables, the GPU storage requirements can be further reduced in the precondition of meeting the requirements of traveltime storage precision; by introducing the manner of storing the traveltime tables and the effective Q tables in which the index files and the data files are combined, and optimizing the storage order of the traveltime tables and the effective Q tables in the data files, the GPU thread is facilitated in achieving rapid reading of the traveltime and the effective Q.

In order to better understand the calculation process of multi-thread reading of the optimized traveltime table and the optimized effective Q table and the migration amplitude within the GPU block in the integral prestack depth migration method provided in the above embodiment, the present embodiment is still illustrated by taking the imaging space of the target working area in the above embodiment as an example.

For any computer node, it contains a CPU and a GPU, wherein in the CPU, the optimized traveltime table and effective Q table of an imaging space of a target working area are stored for each imaging line. The optimized traveltime table and the optimized effective Q table of each imaging line are constituted by one index file and one data file.

The index file of the optimized traveltime table of the imaging line describes the block dividing scheme of an imaging area of the imaging line, including imaging block dividing parameters $mx_b$, $mz_b$, $nx_b$ and $nz_b$ in an imaging line area; shared traveltime table optimization parameters $mx_P^\tau$, $my_P^\tau$, $dx_P^\tau$, and $dy_P^\tau$ within each imaging block; and a storage position $idx_0^\tau$ of an optimized traveltime table of a first imaging point within each imaging block in the data file of the imaging line optimized traveltime table.

The index file of the optimized effective Q table of the imaging line also describes the block dividing scheme of an imaging area of the imaging line, including imaging block dividing parameters $mx_b$, $mz_b$, $nx_b$ and $nz_b$ in an imaging line area; shared effective Q table optimization parameters $mx_P^Q$, $my_P^Q$, $dx_P^Q$, and $dy_P^Q$ within each imaging block; and a storage position $idx_0^Q$ of an optimized effective Q table of a first imaging point within each imaging block in the data file of the imaging line optimized effective Q table.

Moreover, the data files of the optimized traveltime table and the optimized effective Q table of the imaging line are stored in an unsigned short integer variable type.

The data file of the optimized traveltime table stores the traveltime from each shot point on the $my_P^\tau \times mx_P^\tau$ shot point grid of the seismic waves obtained after optimization to the imaging point according to the first relation in the above embodiment.

The data file of the optimized effective Q table directly stores the effective Q from each shot point on the $my_P^Q \times mx_P^Q$ shot point grid of the seismic waves obtained after optimization to the imaging point according to the second relation in the above embodiment.

Besides, when the GPU calculates the migration amplitudes of the imaging points corresponding to different offsets, the steps are as follows:

Step 41: dividing, by the CPU, the imaging space of the target working area into different imaging lines according to y coordinates thereof.

Step 42: determining, by the CPU, storage files of the optimized traveltime table and the optimized effective Q table of the imaging line corresponding to the imaging line, from the optimized traveltime table and the optimized effective Q table of the imaging space of the target working area according to coordinates of the imaging line in the y-direction.

Step 43: reading, by the CPU, the prestack seismic trace, acquiring the shot point coordinates sx, sy thereof, the receiver point coordinates gx, gy and the seismic data, and sending them to the GPU.

Step 44: reading, by the CPU, the storage files of the optimized traveltime table and the optimized effective Q table of the imaging line, and sending them to the GPU.

Step 45: determining a size of the GPU block: blockDim.x=32; blockDim.y=16.

A size of the GPU grid is determined according to sampling numbers nx, nz of the imaging line in the x-direction and the z-direction:

$$gridDim.x = (\text{int})\left(\frac{nz}{32} + 1\right),$$

$$gridDim.y = (\text{int})\left(\frac{nx}{16} + 1\right).$$

Step 46: determining, by the GPU, a thread index of each imaging point in the imaging line:

Depth position index $izi$=blockIdx.$x$×blockDim.$x$+threadIdx.$x$;

Transverse position index $ixi$=blockIdx.$y$×blockDim.$y$+threadIdx.$y$.

Figure 8:
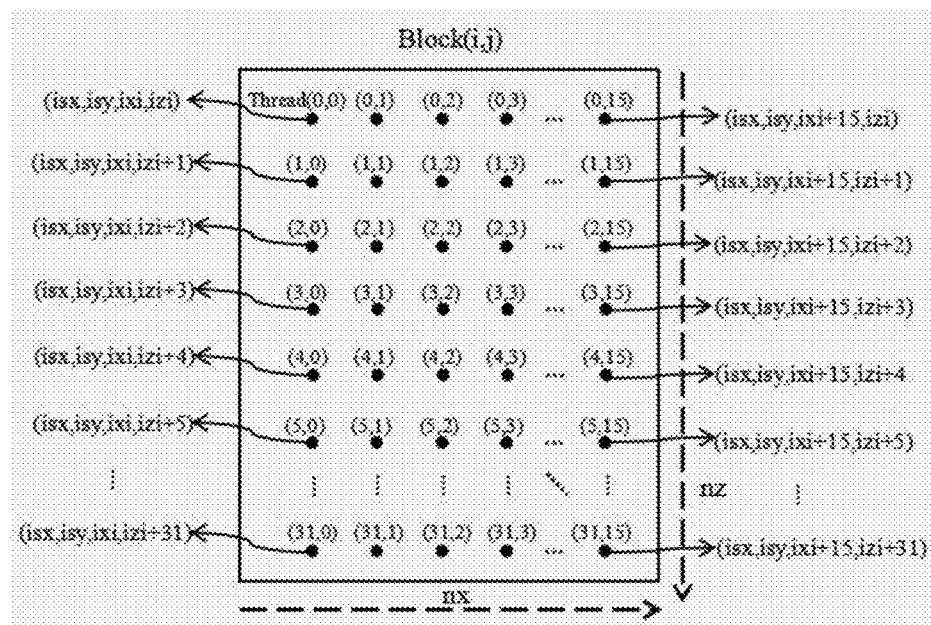
FIG. 8 is a schematic diagram of multi-thread reading of data files of an optimized traveltime table or effective Q table within a GPU block provided in an embodiment of the present disclosure.

Step 47: reading, by each thread of the GPU, the index files of the optimized traveltime table and the optimized effective Q table of the imaging line, determining the imaging block where the imaging point is located, traveltime table optimization parameters $mx_P^\tau$ and $my_P^\tau$, a storage position $idx_0^\tau$ of the optimized traveltime table of the first imaging point within the imaging block where the imaging point is located in the data file of the optimized traveltime table of the imaging line, effective Q table optimization parameters $mx_P^Q$ and $my_P^Q$, and a storage position $idx_0^Q$ of the optimized effective Q table of the first imaging point within the imaging block where the imaging point is located in the data file of the optimized effective Q table of the imaging line, according to x-direction coordinates and z-direction coordinates of the imaging point ($y_p$, $x_p$, $z_p$). Herein, reference can be made to FIG. 8, which is a schematic diagram of multi-thread reading of data files of the optimized traveltime table or the optimized effective Q table within the GPU block.

Step 48: acquiring, by each thread of the GPU, traveltime $\tau_s$, effective Q $Q_s$ from the shot point corresponding to the prestack seismic trace to the imaging point, and traveltime $\tau_g$, effective Q $Q_g$ from the receiver point corresponding to the prestack seismic trace to the imaging point, according to shot point coordinates sx, sy, and receiver point coordinates gx, gy of the prestack seismic trace and the storage files of the optimized traveltime table and the optimized effective Q table corresponding to the imaging line.

Specifically, the step of calculating traveltime $\tau_s$ from the shot point corresponding to the prestack seismic trace to the imaging point and traveltime $\tau_g$ from the receiver point to the imaging point includes:

Step 481: obtaining the optimized traveltime table grid corresponding to the shot point coordinates sx, sy of the prestack seismic trace and index values of four vertexes of the grid, according to the shot point coordinates sx, sy of the prestack seismic trace, the optimization traveltime table parameters $mx_P^\tau$ and $my_P^\tau$, and the intervals $dx_P^\tau$ and $dx_P^\tau$;

$(ixs_1,iys_1)$, $(ixs_2,iys_2)$, $(ixs_3,iys_3)$, $(ixs_4,iys_4)$

For $(ixs_j, iys_j)$, $j=1, 2, 3, 4$, a position of its traveltime in a data storage file of the optimized traveltime table of the imaging line is calculated;

$$idx_j = (ixs_j \times my_P^\tau + iys_j) \times (nzb \times nxb) + ixb \times nzb + izb + idx_0^\tau$$
$$j=1,2,3,4$$

and the corresponding traveltime $\tau_{GPU_j}$, $j=1, 2, 3, 4$ is read.

Step 482: by using a formula $$S_j = \frac{k}{\tau_{GPU_j} - b},$$

$j=1, 2, 3, 4$, wherein k is $$\frac{\max \tau}{65535},$$

max τ is a maximal value of the traveltime in the optimized traveltime table of the imaging space of the target working area, b is 0.0, calculating slowness values of four vertexes of the grid, applying the interpolation method in the above embodiment, to obtain a slowness value $S_s$ of the imaging point, and working out its reciprocal to obtain the traveltime $\tau_s$ from the shot point corresponding to the prestack seismic trace to the imaging point.

Likewise, sx is changed to gx, and sy is changed to gy in the above steps 481~482, so that the traveltime $\tau_g$ from the receiver point corresponding to the prestack seismic trace to the imaging point can be obtained.

Besides, the step of calculating the effective Q $Q_s$ from the shot point corresponding to the prestack seismic trace to the imaging point, and the effective Q $Q_g$ from the receiver point to the imaging point includes:

Step 483: obtaining an optimized effective Q table grid corresponding to the shot point coordinates sx, sy of the prestack seismic trace and index values of four vertexes of the grid, according to the shot point coordinates sx, sy of the prestack seismic trace, the optimized effective Q table parameters $mx_P^Q$ and $mx_P^Q$, and intervals $dx_P^Q$ and $dy_P^Q$:

$(ixs_1^Q,iys_1^Q),(ixs_2^Q,iys_2^Q),(ixs_3^Q,iys_3^Q),(ixs_4^Q,iys_4^Q)$

For $(ixs_j^Q, iys_j^Q)$, $j=1, 2, 3, 4$, a position of its effective Q in the data storage file of the optimized effective Q table of the imaging line is calculated:

$$idx_j^Q = (ixs_j^Q \times my_P^Q + iys_j^Q) \times (nzb \times nxb) + ixb \times nzb + izb + idx_0^Q \, j=1,2,3,4,$$

and the corresponding effective Q $Q_{GPU_j}$, $j=1, 2, 3, 4$ is read.

Step 484: obtaining the effective Q $Q_s$ from the shot point corresponding to the prestack seismic trace to a propagation path of the imaging point using the interpolation method in the above embodiment.

Likewise, sx is changed to gx, and sy is changed to gy in the above steps 483~484, so that the effective Q $Q_g$ from the receiver point corresponding to the prestack seismic trace to the propagation path of the imaging point can be obtained.

Step 49, calculating, by each thread of the GPU, migration amplitude of an imaging point according to the imaging formula in the above embodiment.

Figure 9:
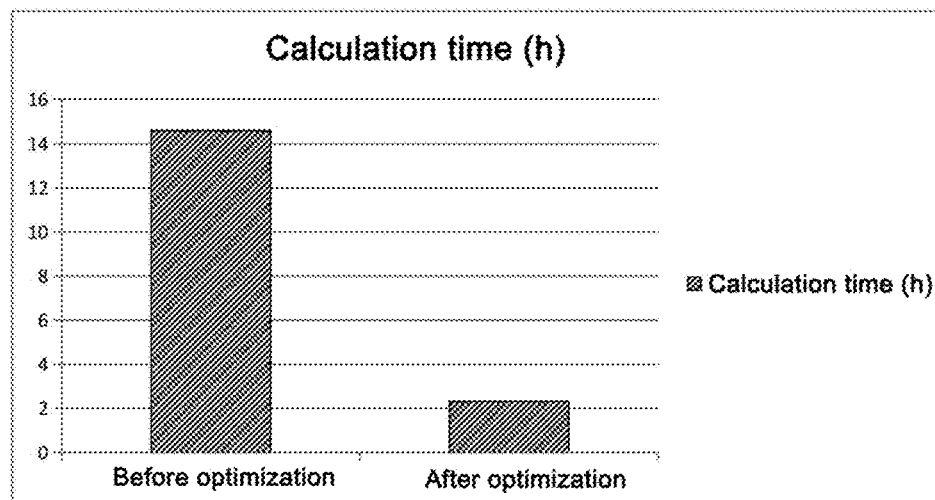
FIG. 9 is a schematic comparison diagram of calculation time, without application of the optimized traveltime table and effective Q table and with application of the optimized traveltime table and effective Q table, of utilizing the GPU card to execute the operation of compensation medium absorption Kirchhoff prestack depth migration for a certain calculation node provided in an embodiment of the present disclosure.
Figure 10A:
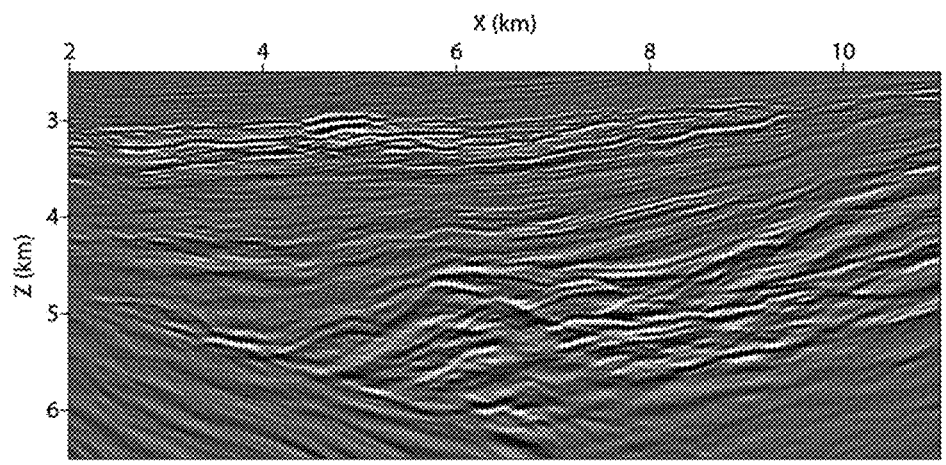
FIG. 10a, FIG. 10b, FIG. 10c and FIG. 10d are respectively X-direction section, Y-direction section, Z=3 km section and Z=5 km section of compensation medium absorption Kirchhoff prestack depth migration with single-sensor high-density data acquisition in a certain working area provided in an embodiment of the present disclosure.
Figure 10B:
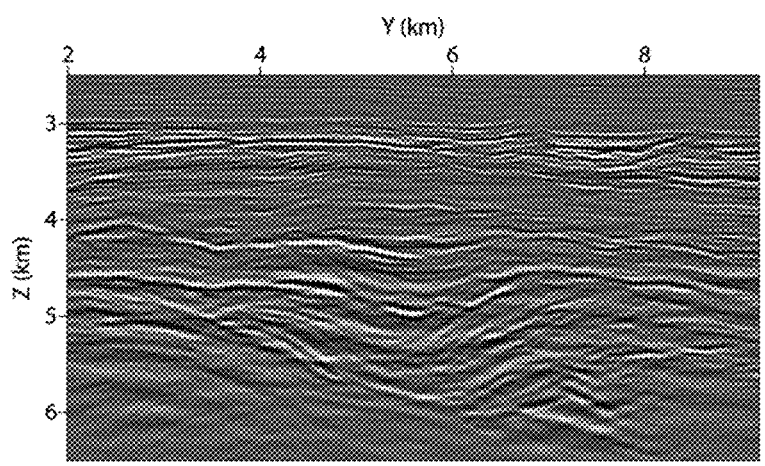
Figure 10C:
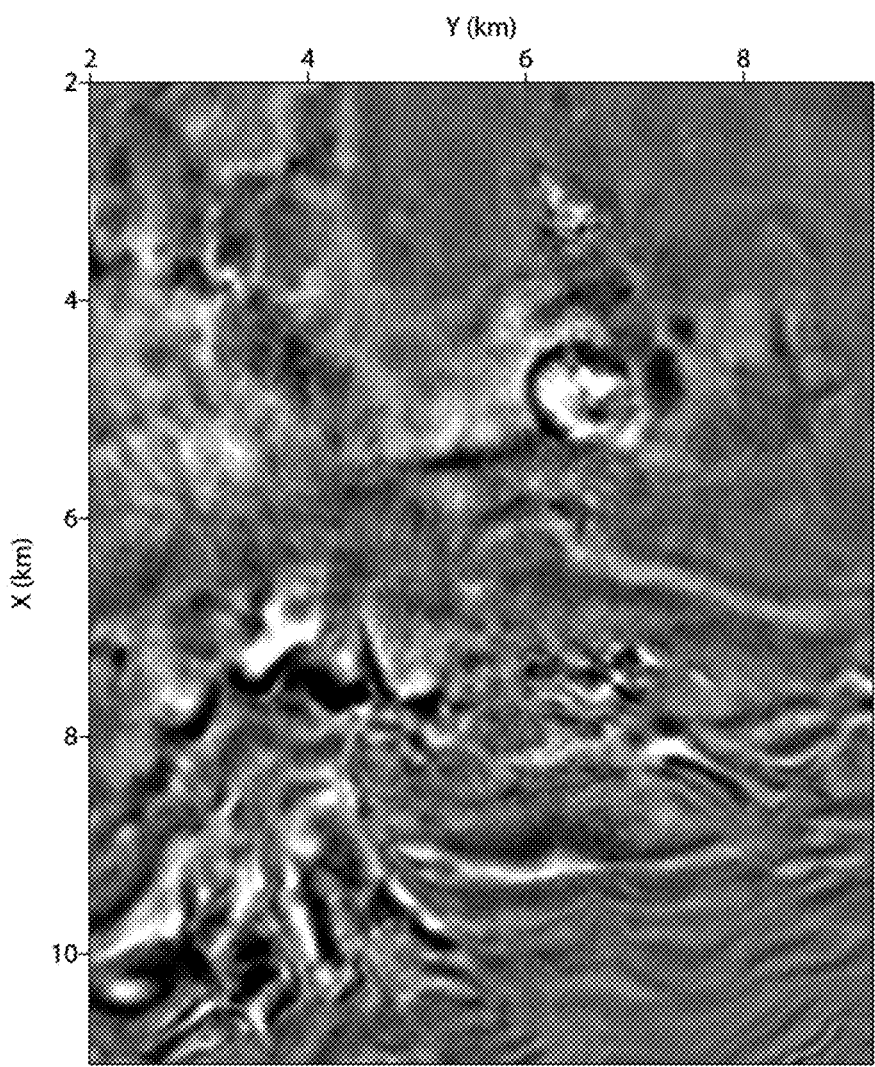
Figure 10D:
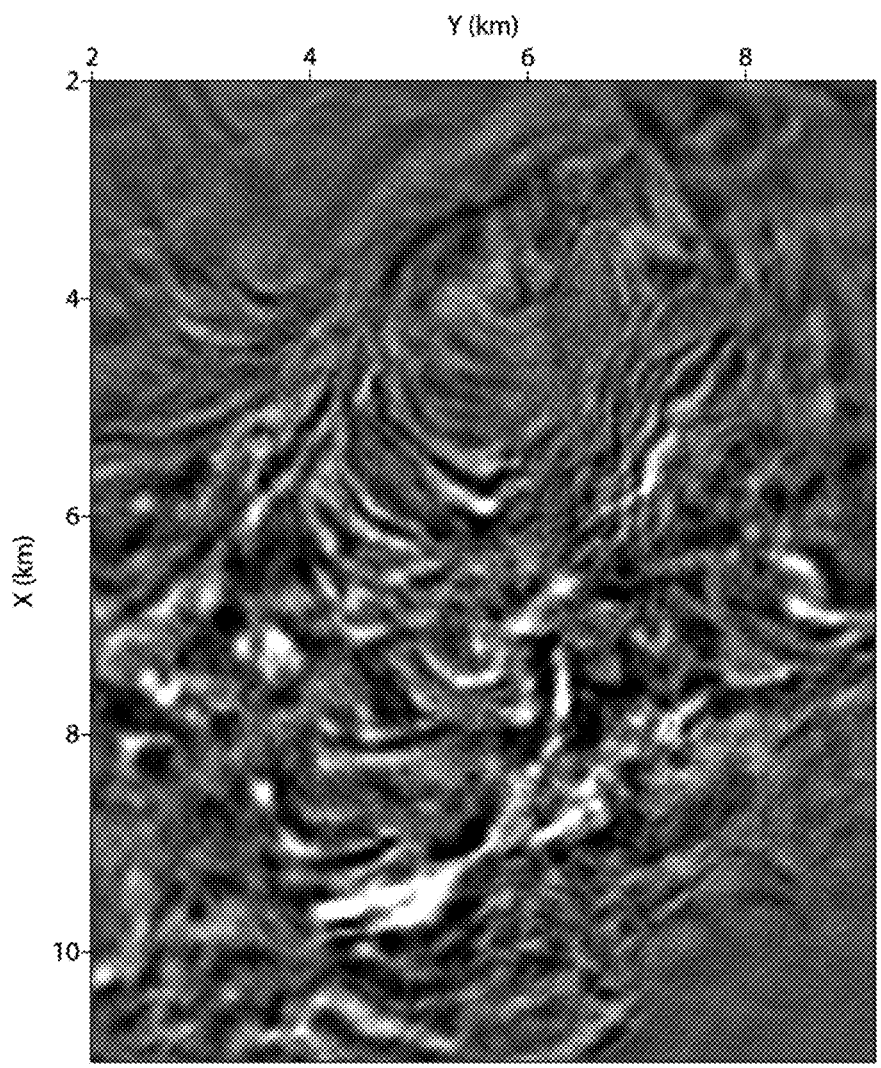

Herein, referring to FIG. 9, it shows a schematic comparison diagram of calculation time, without application of the optimized traveltime table and effective Q table and with application of the optimized traveltime table and effective Q table, of utilizing the GPU card to execute the operation of compensation medium absorption Kirchhoff prestack depth migration of one imaging line for a certain calculation node provided in an embodiment of the present disclosure, wherein input seismic prestack data distributed to this calculation node has a size of 194 G. In a result shown in FIG. 9, the calculation time is 14.58 hours before the traveltime table and the effective Q table are optimized, and the calculation time is 2.32 hours after the traveltime table and the effective Q table are optimized. The calculation efficiency is increased by 6.29 times after applying the optimization of the traveltime table and the effective Q table. This is because in the solution where the optimized traveltime table and effective Q table are not applied, since the traveltime table and the effective Q table of an entire imaging line require a too large storage capacity, far exceeding the memory of the GPU card, we can only sequentially read the traveltime table and the effective Q table of each imaging point contained in the imaging line using the CPU, and then send them to the GPU through communication between the CPU and the GPU, so as to meet the requirements of the traveltime table and the effective Q table when the calculation of the migration amplitude of each imaging point contained in the imaging line is performed using multiple threads of the GPU; and in the operation that the compensation medium absorption Kirchhoff prestack depth migration, there is a multiple-to-multiple relationship between the migration amplitude of the imaging point and the input seismic trace data, that is, the migration amplitude of each imaging point in the imaging space is a result of jointly calculating and then superimposing hundreds to thousands seismic data, meanwhile, each input seismic trace data will take part in the migration calculation of millions of imaging points. This causes that frequent and repeated reading of the traveltime table and the effective Q table limits the operation process of compensation medium absorption Kirchhoff prestack depth migration to a communication bottleneck between the CPU and the GPU, while the thread in a processor of the GPU responsible for the migration amplitude calculation is usually in a standby state, and restricts a parallel speedup ratio of the GPU when using multiple threads to calculate migration amplitude for each imaging point contained in the imaging line, thereby lowering the calculation efficiency of this solution. In contrast, in the solution where the optimized traveltime table and the optimized effective Q table are applied, since the storage capacity required by the optimized traveltime table and the optimized effective Q table of the entire imaging line is greatly reduced, we can transfer the optimized traveltime table and the optimized effective Q table of the entire imaging line to the GPU only through one time of communication between the CPU and the GPU, and store them in the global memory of the GPU, subsequently, the multiple threads in the GPU block, referring to FIG. 8, can read the data files of the optimized traveltime table and effective Q table in parallel, and then uses the method provided in the embodiment of the present disclosure to further calculate the migration amplitude of the imaging point. Since a velocity for the GPU thread to read the global memory is far faster than communication velocity between the CPU and the GPU, this solution can render a quite high speed-up ratio and calculation efficiency.

Besides, referring to FIG. 10a, FIG. 10b, FIG. 10c and FIG. 10d, they are respectively X-direction section, Y-direction section, Z=3 km section and Z=5 km section of a processed data volume of compensation medium absorption Kirchhoff prestack depth migration with single-sensor high-density data acquisition in a certain working area provided in an embodiment of the present disclosure. It needs to indicate that an imaging space of this data volume contains 360 imaging lines in total, the optimization solution of the traveltime table and the effective Q table provided in the embodiment of the present disclosure is applied in the migration calculation, and GPU cluster calculation time thereof adds up to about 35 days; and if the optimization solution of the traveltime table and the effective Q table provided in the embodiment of the present disclosure is not applied, a processing cycle of compensation medium absorption Kirchhoff prestack depth migration of a dataset of this working area is predicted to reach 220 days.

Thus, with the integral prestack depth migration method provided in the present embodiment, the storage requirement to GPU hardware is greatly reduced, and in the precondition of ensuring the calculation precision, the calculation efficiency of performing the parallel calculation of compensation medium absorption Kirchhoff prestack depth migration on the basis of the GPU is effectively improved, thus greatly shortening the calculation cycle thereof.

Figure 11:
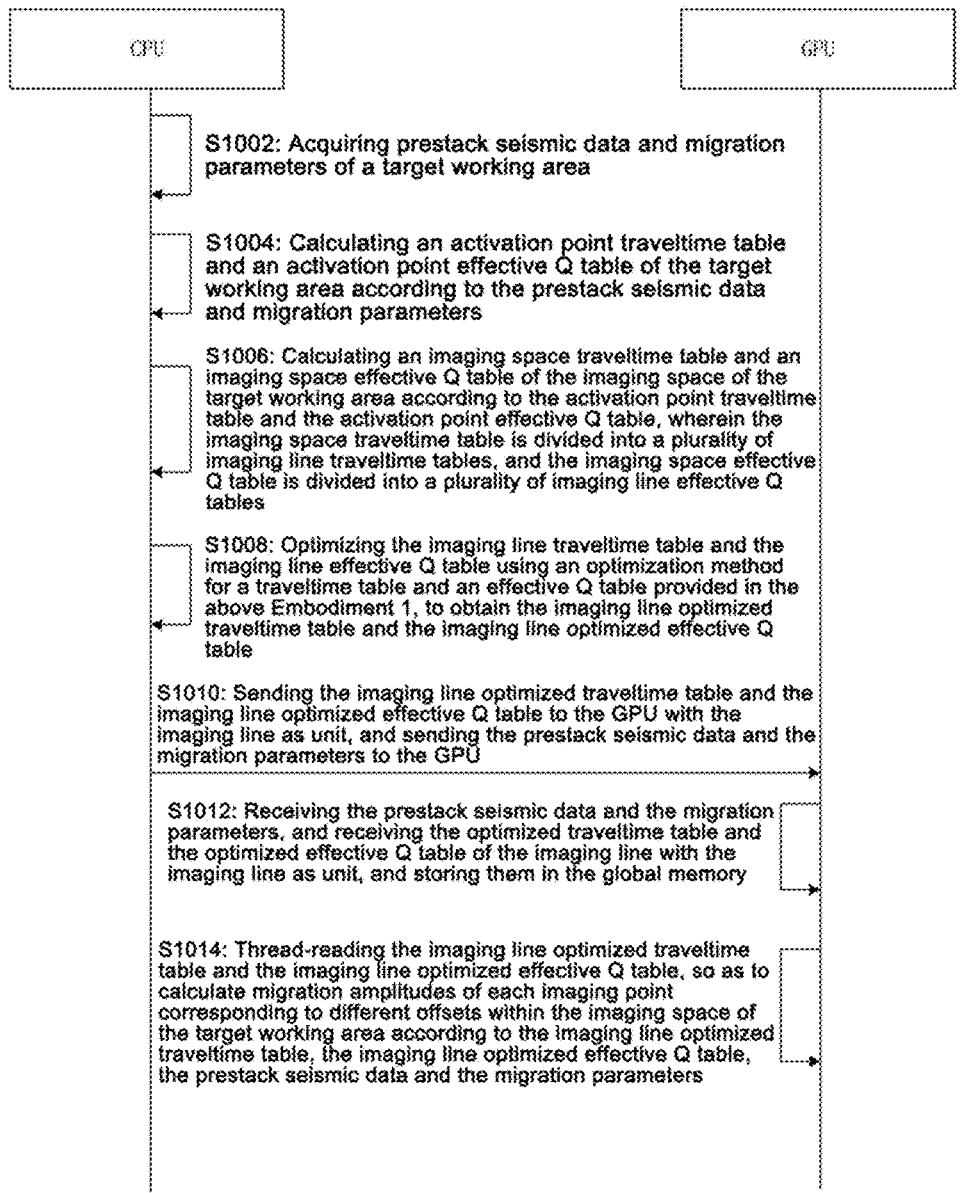
FIG. 11 is a schematic flowchart of another integral prestack depth migration method provided in an embodiment of the present disclosure.

Referring to FIG. 11, it shows another integral prestack depth migration method provided in an embodiment of the present disclosure. As can be seen from FIG. 11, this method includes following steps:

Step 1002: acquiring, by a CPU, prestack seismic data and migration parameters of a target working area.

For a single calculation node, the calculation node contains a CPU and a GPU, and in one of the embodiments, the calculation node can acquire from a cluster computer host node the prestack seismic data and the migration parameters distributed to this calculation node.

Step 1004: calculating, by the CPU, an activation point traveltime table and an activation point effective Q table of the target working area according to the prestack seismic data and migration parameters.

In at least one possible embodiment, a cluster computer host node distributes calculation tasks of the activation point traveltime table and the effective Q table to each calculation node according to a plane scope of the target working area, and each calculation node of the cluster computer uses CPU to apply a rapid wavefront method to calculate an activation point traveltime table and an effective Q table within the plane scope distributed to the present calculation node. Moreover, finally, the activation point traveltime table and the effective Q table of the target working area are recovered and formed by the host node.

Step 1006: calculating, by the CPU, an imaging space traveltime table and an imaging space effective Q table of the imaging space of the target working area according to the activation point traveltime table and the activation point effective Q table, wherein the imaging space traveltime table is divided into a plurality of imaging line traveltime tables, and the imaging space effective Q table is divided into a plurality of imaging line effective Q tables.

Herein, reference can be made to related contents in the above embodiment for a calculation process of the imaging space traveltime table and the imaging space effective Q table of the imaging space of the target working area, and unnecessary details will not be given herein.

Step 1008: optimizing, by the CPU, the imaging line traveltime table and the imaging line effective Q table using the data optimization method provided in the above embodiment, to obtain the imaging line optimized traveltime table and the imaging line optimized effective Q table.

Step 1010: sending, by the CPU, the imaging line optimized traveltime table and the imaging line optimized effective Q table to the GPU with the imaging line as an unit, and sending the prestack seismic data and the migration parameters to the GPU.

Step 1012: receiving, by the GPU, the prestack seismic data and the migration parameters, and receiving the optimized traveltime table and the optimized effective Q table of the imaging line with the imaging line as an unit, and storing them in the global memory.

Step 1014: thread-reading, by the GPU, the imaging line optimized traveltime table and the imaging line optimized effective Q table, so as to calculate migration amplitudes of each imaging point corresponding to different offsets within the imaging space of the target working area according to the imaging line optimized traveltime table, the imaging line optimized effective Q table, the prestack seismic data and the migration parameters.

In another embodiment, after the above step S1014, the integral prestack depth migration method further includes:

sending, by the GPU, amplitudes of each imaging point corresponding to different offsets within the imaging space of the target working area, with the imaging line as an unit, to the CPU;

receiving, by the CPU, amplitudes of each imaging point corresponding to different offsets within the imaging space of the target working area from the GPU with the imaging line as an unit, and outputting them to a persistent storage medium.

The present embodiment introduces a process that the CPU and the GPU calculate in parallel cooperatively to realize the integral prestack depth migration calculation, wherein reference can be made to the corresponding contents of the above embodiments for detailed working processes of the CPU and the GPU, and unnecessary details will not be given herein.

The integral prestack depth migration method provided in the embodiment of the present disclosure has the same technical feature as the data optimization method provided in the above embodiments, therefore, it also can solve the same technical problem, and achieve the same technical effect.

Unless otherwise specified, components and relative steps of the steps, numerical expressions and numerical values illustrated in these embodiments do not limit the scope of the present disclosure.

In all examples shown and described herein, any specific value should be explained as merely illustrative, rather than restrictive, therefore, other examples of the exemplary embodiments may have different values.

The flowchart and the blocks in the accompanying drawings show possible system structures, functions, and operations of the system, method, and computer program products according to multiple embodiments of the present disclosure. In this regard, each block in the flowchart or the block may represent a part of one module, program segment, or code, wherein the part of the module, the program segment, or the code contains one or more executable instructions configured to achieve a specified logical function. It also should be noted that in some implementations as substitution, the functions indicated in the blocks also may be proceed in an order different from that indicated in the accompanying drawings. For example, two continuous blocks practically can be executed substantially in parallel, and they sometimes also may be executed in a reverse order, which depends upon a function involved. It also should be noted that each block in the block diagram and/or flowchart, and combinations of the blocks in the block diagram and/or the flowchart can be realized by a dedicated hardware-based system configured to execute a specified function or action, or can be realized by a combination of dedicated hardware and computer instructions.

In addition, in the description of the embodiments of the present disclosure, it should be indicated that unless otherwise specified and defined explicitly, terms "mount", "join", and "connect" should be construed in a broad sense. For example, it may be fixed connection, detachable connection, or integral connection; it may be mechanical connection, and also may be electrical connection; it may be direct connection, indirect connection via an intermediate medium, or inner communication between two elements. For those ordinarily skilled in the art, specific meanings of the above-mentioned terms in the present disclosure can be understood according to specific circumstances.

In the description of the present disclosure, it should be indicated that orientational or positional relations indicated by terms "center", "upper", "lower", "left", "right", "vertical", "horizontal", "inner", "outer" and so on are based on orientational or positional relations as shown in the accompanying drawings, merely for facilitating the description of the present disclosure and simplifying the description, rather than indicating or implying that related devices or elements have to be in the specific orientation or configured and operated in a specific orientation, therefore, they should not be construed as limiting the present disclosure. Besides, terms "first", "second", and "third" are merely for descriptive purpose, but should not be construed as indicating or implying relative importance.

A computer program product for performing the data optimization method provided in an embodiment of the present disclosure includes a computer readable storage medium storing non-volatile program code executable by a processor, and instructions included in the program code may be used to execute the method described in the method embodiment in the preceding. Reference may be made to the method embodiments for specific implementation, which will not be repeated redundantly herein.

If the function is realized in a form of software functional unit and is sold or used as an individual product, it may be stored in a non-volatile computer readable storage medium executable by a processor. Based on such understanding, the technical solutions in essence, or the parts making contribution to the prior art, or parts of the technical solutions of the present disclosure, can be embodied in form of a software product, and this computer software product is stored in a storage medium, including several instructions for making one computer device (which can be a personal computer, a server or a network device etc.) execute all or part of the steps of the methods of various embodiments of the present application. The aforementioned storage medium includes various media in which program codes can be stored, such as U disk, mobile hard disk, Read-Only Memory (ROM), Random Access Memory (RAM), diskette and compact disk.

Finally, it should be indicated that the embodiments above are merely specific embodiments of the present disclosure, for illustrating the technical solutions of the present disclosure, rather than limiting the present disclosure. The scope of protection of the present disclosure should not be limited thereto. While the detailed description is made to the present disclosure with reference to the above-mentioned embodiments, those ordinarily skilled in the art should understand that any technician familiar with the present technical field still can modify or readily envisage changes to the technical solutions recited in the above-mentioned embodiments, or make equivalent substitutions to some of the technical features therein, within the technical scope disclosed in the present disclosure; these modifications, changes or substitutions do not make the corresponding technical solutions essentially depart from the spirit and scope of the technical solutions of the embodiments of the present disclosure, and all should be covered within the scope of protection of the present disclosure. Therefore, the scope of protection of the present disclosure should be based on the scope of protection of the claims.

INDUSTRIAL APPLICABILITY

The data optimization method and the integral prestack depth migration method provided in the present disclosure greatly improve the efficiency of GPU parallel calculation, can realize high-precision imaging of deep and super deep exploration targets with complicated structure, facilitate acquiring lithology and refined small-scale structural information of the deep and super deep subsurface exploration targets, thus having important industrial application value to exploration of deep and super deep complex structure and lithologic reservoirs.

What is claimed is:

1. An integral prestack depth migration method, applicable to a central processing unit (CPU), the method comprising:
  acquiring prestack seismic data and migration parameters of a target working area, and an imaging line traveltime table and an imaging line effective Q table of an imaging space of the target working area;
  optimizing the imaging line traveltime table and the imaging line effective Q table using a data optimization method to obtain an imaging line optimized traveltime table and an imaging line optimized effective Q table;
  storing the imaging line optimized traveltime table and the imaging line optimized effective Q table with the imaging line as an unit; and
  sending to a graphics processing unit (GPU) the prestack seismic data, the migration parameters, the imaging line optimized traveltime table and the imaging line optimized effective Q table, with the imaging line as an unit, so as to calculate migration amplitudes of each imaging point corresponding to different offsets within the imaging space of the target working area according to the imaging line optimized traveltime table, the imaging line optimized effective Q table, the prestack seismic data and the migration parameters,
  wherein the data optimization method comprises:
  acquiring a target matrix to be optimized, wherein the target matrix is a traveltime table or an effective Q table;
  generating a first sequence according to the target matrix;
  rarefying the first sequence according to a preset grid density to obtain a value position of each element of a second sequence, and working out a value of each element of the second sequence on the basis of the principle of least squares, wherein the number of elements of the second sequence is far less than the number of elements of the first sequence;

performing interpolation on the second sequence to obtain a third sequence, wherein the third sequence and the first sequence have the same number of elements;

calculating a target matrix corresponding to the third sequence;

calculating an error between the target matrix to be optimized and the target matrix corresponding to the third sequence;

comparing magnitudes of the error and a preset first error threshold, wherein when the error is greater than the preset first error threshold, a grid density is increased according to a preset rule, and it is continued to perform the step of rarefying the first sequence according to the preset grid density to obtain the value position of each element of the second sequence; and recording, when the error is less than the first error threshold, the target matrix corresponding to the second sequence as an optimized target matrix of the target matrix to be optimized.

2. The integral prestack depth migration method according to claim 1, wherein the step of storing the imaging line optimized traveltime table and the imaging line optimized effective Q table with the imaging line as an unit comprises:

constructing a first index file of the imaging line optimized traveltime table and a second index file of the imaging line optimized effective Q table with the imaging line as an unit, wherein the first index file comprises an imaging block dividing parameter of the imaging line, a shared traveltime table optimization parameter within each of the imaging blocks, and a storage position of an optimized traveltime table of a first imaging point within each of the imaging blocks in a data file of the imaging line optimized traveltime table; the second index file comprises an imaging block dividing parameter, a shared effective Q table optimization parameter within each of the imaging blocks, and a storage position of an optimized effective Q of a first imaging point within each of the imaging blocks in a data file of the imaging line optimized effective Q table; and storing the first index file and the second index file, and storing the data file of the imaging line optimized traveltime table and the data file of the imaging line optimized effective Q table in an unsigned short integer variable type.

3. The integral prestack depth migration method according to claim 2, wherein the step of storing the data file of the imaging line optimized traveltime table and the data file of the imaging line optimized effective Q table in an unsigned short integer variable type comprises:

storing the data file of the imaging line optimized traveltime table and the data file of the imaging line optimized effective Q table respectively as for individual imaging blocks, according to a first relation and a second relation, wherein the first relation is:

$\tau^{GPU}[imx_P^\tau, imy_P^\tau, ixi, izi]$=(unsigned short int)($\tau^{opti}[ixi, izi, imx_P^\tau, imy_P^\tau] \times k + b$);

the second relation is:

$Q^{GPU}[imx_P^Q, imy_P^Q, ixi, izi]$=(unsigned short int)($Q^{opti}[ixi, izi, imx_P^Q, imy_P^Q]$);

in the formula: ixi is an x-direction index of a position of an imaging point within an imaging block, izi is a z-direction index of the position of the imaging point within the imaging block, $imx_P^\tau$ is an x-direction index of a shot point in an imaging point optimized traveltime table, $imy_P^\tau$ is a y-direction index of the shot point in the imaging point optimized traveltime table, $imx_P^Q$ is an x-direction index of a shot point in an imaging point optimized effective Q table, $imy_P^Q$ is a y-direction index of the shot point in the imaging point optimized effective Q table; k is $$\frac{\max\tau}{65535},$$

max τ is a maximal value of the traveltime in an imaging space optimized traveltime table of the target working area, b is 0.0; $\tau^{GPU}[imx_P^\tau, imy_P^\tau, ixi, izi]$ represents a storage order of data files of the imaging block optimized traveltime table; $\tau^{opti}[ixi, izi, imx_P^\tau, imy_P^\tau]$ represents a data format of the imaging block optimized traveltime table; $Q^{opti}[ixi, izi, imx_P^Q, imy_P^Q]$ represents a data format of the imaging block optimized effective Q table; $Q^{GPU}[imx_P^Q, imy_P^Q, ixi, izi]$ represents a storage order of data files of the imaging block optimized effective Q table.

4. The integral prestack depth migration method according to claim 1, wherein the GPU only receives the imaging line optimized traveltime table and the imaging line optimized effective Q table of one imaging line at one time, and calculates the migration amplitudes to each imaging point corresponding to different offsets in the imaging line according to the imaging line optimized traveltime table, the imaging line optimized effective Q table, the prestack seismic data and the migration parameters, and after the imaging line is calculated, the imaging line optimized traveltime table and the imaging line optimized effective Q table corresponding to a next imaging line are received to perform a new round of calculation, which is repeated until the migration amplitudes of each imaging point corresponding to different offsets within the imaging space of the target working area are calculated.

5. An integral prestack depth migration method, applicable to a GPU, the method comprising:

receiving prestack seismic data and migration parameters of a target working area sent by a CPU, and an imaging line optimized traveltime table and an imaging line optimized effective Q table of an imaging space of the target working area sent by the CPU with the imaging line as an unit, wherein the imaging space is divided into a plurality of imaging lines, each of the imaging lines is divided into a plurality of imaging blocks, and each imaging block contains a plurality of imaging points; the imaging line optimized traveltime table and the imaging line optimized effective Q table are obtained by optimizing, by the CPU using a data optimization method, an imaging line traveltime table and an imaging line effective Q table of the target working area; and calculating migration amplitudes of each imaging point corresponding to different offsets within the imaging space of the target working area according to the imaging line optimized traveltime table, the imaging line optimized effective Q table, the prestack seismic data and the migration parameters, wherein the data optimization method comprises:
acquiring a target matrix to be optimized, wherein the target matrix is a traveltime table or an effective Q table;
generating a first sequence according to the target matrix;
rarefying the first sequence according to a preset grid density to obtain a value position of each element of a second sequence, and working out a value of each element of the second sequence on the basis of the principle of least squares, wherein the number of elements of the second sequence is far less than the number of elements of the first sequence;
performing interpolation on the second sequence to obtain a third sequence, wherein the third sequence and the first sequence have the same number of elements;
calculating a target matrix corresponding to the third sequence;
calculating an error between the target matrix to be optimized and the target matrix corresponding to the third sequence;
comparing magnitudes of the error and a preset first error threshold, wherein when the error is greater than the preset first error threshold, a grid density is increased according to a preset rule, and it is continued to perform the step of rarefying the first sequence according to the preset grid density to obtain the value position of each element of the second sequence; and
recording, when the error is less than the first error threshold, the target matrix corresponding to the second sequence as an optimized target matrix of the target matrix to be optimized.

6. The integral prestack depth migration method according to claim 5, wherein the CPU and the GPU calculate in parallel cooperatively, at this time, the GPU can acquire the prestack seismic data and the migration parameters of the target working area from the CPU, and moreover, the GPU only receives the imaging line optimized traveltime table and the imaging line optimized effective Q table of one imaging line at one time, and calculates the migration amplitudes of each imaging point corresponding to different offsets in the imaging line according to the imaging line optimized traveltime table and the imaging line optimized effective Q table, the prestack seismic data and the migration parameters, and after the imaging line is calculated, the imaging line optimized traveltime table and the imaging line optimized effective Q table corresponding to a next imaging line are received to perform a new round of calculation.

7. The integral prestack depth migration method according to claim 5, wherein the step of calculating migration amplitudes of each imaging point corresponding to different offsets within the imaging space of the target working area according to the imaging line optimized traveltime table, the imaging line optimized effective Q table, the prestack seismic data and the migration parameters comprises:
acquiring shot point coordinates and receiver point coordinates of a prestack seismic trace;
determining a size of a GPU block and a size of a GPU grid;
calculating a thread index of each imaging point in the imaging line according to the size of the GPU block and the size of the GPU grid, wherein the thread index comprises a depth position index and a transverse position index;
thread-reading a first index file and a second index file of the imaging line according to the thread index, to determine a traveltime table optimization parameter and an effective Q table optimization parameter of an imaging block where each of the imaging points is located, and a storage position of an optimized traveltime table of a first imaging point within the imaging block where the imaging point is located in a data file of the imaging line optimized traveltime table, and a storage position of an optimized effective Q table of the first imaging point within the imaging block where the imaging point is located in a data file of the imaging line optimized effective Q table;
thread-acquiring traveltime and an effective Q from a shot point corresponding to the prestack seismic trace to the imaging point, and traveltime and an effective Q from a receiver point corresponding to the prestack seismic trace to the imaging point, according to the shot point coordinates, the receiver point coordinates, as well as the first index file and the second index file corresponding to the imaging line, and a data file of the imaging line optimized traveltime table and a data file of the imaging line optimized effective Q table;
thread-calculating a migration amplitude of each imaging point according to an imaging formula, wherein the imaging formula is:

$$I(h, x_p, y_p, z_p) = \frac{\tau_g r_s^3}{\tau_s r_g^3} \int F(\omega)\omega \exp\left(-j\frac{\pi}{2}\right) \exp\left[j\omega(\tau_s + \tau_g) - \left(\frac{\tau_s}{Q_s} + \frac{\tau_g}{Q_g}\right)\frac{\ln(\omega/\omega_0)}{\pi}\right] \exp\left\{\frac{\omega}{2}\left(\frac{\tau_s}{Q_s} + \frac{\tau_g}{Q_g}\right)\right\}d\omega;$$

in the formula: $I(h, x_p, y_p, z_p)$ is a migration amplitude of the imaging point, h is a prestack seismic trace offset, j is an imaginary part unit, $\omega$ is a frequency, $\omega_0$ is a seismic data dominant frequency, $F(\omega)$ is a sequence for the prestack seismic trace converted to a frequency domain, $r_s, r_g$ are distances from the shot point and the receiver point corresponding to the prestack seismic trace to the imaging point respectively, $\tau_s$ and $Q_s$ are traveltime and an effective Q from the shot point corresponding to the prestack seismic trace to the imaging point respectively, and $\tau_g$ and $Q_g$ are traveltime and an effective Q from the receiver point corresponding to the prestack seismic trace to the imaging point respectively.

8. The integral prestack depth migration method according to claim 7, wherein the step of thread-acquiring traveltime from a shot point corresponding to the prestack seismic trace to the imaging point and traveltime from a receiver point corresponding to the prestack seismic trace to the imaging point comprises:
calculating, according to the shot point coordinates, the receiver point coordinates and the traveltime table optimization parameter, a first grid of the optimized traveltime table corresponding to the shot point coordinates as well as first index values of four vertexes of the first grid, and a second grid of the optimized traveltime table corresponding to the receiver point coordinates as well as second index values of four vertexes of the second grid;
calculating, according to the first index value and the second index value, first position and second position of traveltimes of the four vertexes of the first grid and the four vertexes of the second grid in the data files of the imaging line optimized traveltime table, respectively, and reading the traveltimes of the four vertexes of the first grid and the traveltimes of the four vertexes of the second grid according to the first position and the second position;

calculating slowness values of the four vertexes of the first grid, and slowness values of the four vertexes of the second grid, respectively, according to the traveltimes of the four vertexes of the first grid and the traveltimes of the four vertexes of the second grid;

performing respectively interpolation, according to the slowness values of the four vertexes of the first grid and the slowness values of the four vertexes of the second grid, to obtain a first slowness value and a second slowness value of the imaging point; and calculating the traveltime from the shot point corresponding to the prestack seismic trace to the imaging point, and the traveltime from the receiver point corresponding to the prestack seismic trace to the imaging point, respectively, according to the first slowness value and the second slowness value.

9. The integral prestack depth migration method according to claim 7, wherein the step of thread-acquiring an effective Q from a shot point corresponding to the prestack seismic trace to the imaging point and an effective Q from a receiver point corresponding to the prestack seismic trace to the imaging point comprises:

calculating, according to the shot point coordinates, the receiver point coordinates and an effective Q table optimization parameter, a third grid of the optimized effective Q table corresponding to the shot point coordinates as well as third index values of four vertexes of the third grid, and a fourth grid of the optimized effective Q table corresponding to the receiver point coordinates as well as fourth index values of four vertexes of the fourth grid;

calculating, according to the third index values and the fourth index values, third position and fourth position of the effective Q values of the four vertexes of the third grid and the four vertexes of the fourth grid in the data files of the imaging line optimized effective Q table, and reading the effective Q values of the four vertexes of the third grid, and the effective Q values of the four vertexes of the fourth grid according to the third position and the fourth position; and performing respectively interpolation, according to effective Q values of the four vertexes of the third grid, and the effective Q values of the four vertexes of the fourth grid, to obtain the effective Q from the shot point corresponding to the prestack seismic trace to the imaging point, and the effective Q from the receiver point corresponding to the prestack seismic trace to the imaging point.

* * * * *